（12）United States Patent
Hou et al.

(10) Patent No.: US 7,457,088 B2
(45) Date of Patent: Nov. 25, 2008

(54) SYSTEMS AND METHODS FOR PROTECTION OF ELECTRICAL NETWORKS

(75) Inventors: Daqing Hou, Boise, ID (US); Gabriel Benmouyal, Boucherville (CA); Demetrios Tziouvaras, Vacaville, CA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 494 days.

(21) Appl. No.: 11/236,352

(22) Filed: Sep. 27, 2005

(65) Prior Publication Data

US 2006/0067095 A1    Mar. 30, 2006

Related U.S. Application Data

(60) Provisional application No. 60/614,066, filed on Sep. 29, 2004.

(51) Int. Cl.
H02H 3/00 (2006.01)
H02H 7/00 (2006.01)
H02H 7/26 (2006.01)

(52) U.S. Cl. .............................. 361/80; 361/79; 361/81; 361/83; 361/88; 361/62; 361/67

(58) Field of Classification Search ........................ None
See application file for complete search history.

(56) References Cited

U.S. PATENT DOCUMENTS 4,426,670 A    1/1984  Ilar et al.
5,731,943 A *  3/1998  Roberts et al. ................ 361/80
6,519,537 B1   2/2003  Yang
6,833,711 B1   12/2004 Hou

OTHER PUBLICATIONS

Edward Wilson Kimbark, Sc.D, Power System Stability, John Wiles and Sons, Inc., New York, 1950, vol. II.
"Wide Area Protection and Emergency Controls", IEEE Power System Relaying Committee, 2002 Report.
Baden, F.; Innovations In The Detection of Power Swings In Electrical Networks, Relays and Protection Schemes, BBC Brown Boveri & Company CH-ES 35-30 10 E.
Machowski, J.; New Power Swing Blocking; Developments In Power System Protection, Sixth International Conference, IEEE Conf. Pub. No. 434, Mar. 25-27, 1997, pp. 218-221.
Tziouvaras, Demetrios A.; Hou, Daqing, Out-Of-Step Protection Fundamentals And Advancements; Conference.
Cento, De La Ree, Phadke, Michel, Murphy and Burnett; Adaptive Out-Of-Step Relaying Using Phasor Measurement Techniques, IEEE Computer Applications In Power.
Faucon and Dousset; Coordinated Defense Plan Protects Against Transient Instabilities, IEEE Computer Applications In Power.
Hou, Chen, Turner; SEL-321-5 Relay Out-Of-Step Logic; SEL Application Guide, vol. 1, AG97-13.
Hou, Guzman, Roberts; Innovative Solutions Improve Transmission Line Protection.
Power-swing logic (PSL) Chapter 4, Line impedance, pp. 89-97.
New Out of Step Blocking Algoritm for Detecting Fast power Swing Frequencies.
Pole slip protection (PSP) Chapter 4, Line impedance, pp. 98-107.

* cited by examiner

*Primary Examiner*—Stephen W Jackson
*Assistant Examiner*—Dharti H Patel
(74) *Attorney, Agent, or Firm*—Eugene M. Cummings, P.C.

(57) ABSTRACT

A system and method for accomplishing power swing blocking and unstable power swing tripping schemes during disturbances of electrical networks is disclosed. The disclosed system and method eliminates the requirement of stability studies. The no-setting scheme utilizes the swing center voltage of the electrical network to carry out its functions.

11 Claims, 15 Drawing Sheets

SYSTEMS AND METHODS FOR PROTECTION OF ELECTRICAL NETWORKS

CROSS-REFERENCE TO RELATED APPLICATIONS

This application relates to and claims the benefit of priority of U.S. Provisional Patent Application No. 60/614,066, filed Sep. 29, 2004. The full disclosure of U.S. Provisional Patent Application No. 60/614,066, filed Sep. 29, 2004, is hereby incorporated herein by reference.

BACKGROUND OF THE INVENTION

The present invention relates generally to power system protection techniques, and more particularly, power system protection techniques that are relatively easy and relatively inexpensive to implement.

A power system (or electrical network) is said to be operating under steady-state conditions when there exists a balance between generated and consumed active power for the system. Power systems operating under steady-state conditions typically operate at or very near their nominal frequency. In the case of power systems within the United States of America, the nominal frequency is equal to sixty cycles per second (or sixty hertz).

Under certain circumstances, a power system can be disturbed such that it no longer operates under steady-state conditions. In that regard, power systems are subjected to a wide range of small or larger disturbances during operating conditions. Small changes in loading conditions occur continually. The power system must adjust to these changing conditions and continue to operate satisfactorily and within the desired bounds of voltage and frequency. A power swing condition can be the result of a disturbance that causes the power system to be removed from its steady state operating condition. Such power swings are characterized by variations in the power flow for a power system. These variations occur when the internal voltages of system generators slip relative to each other. Power system faults, line switching, generator disconnection, and the loss or the application of large amounts of load are examples of system disturbances that can cause a power swing condition to occur in a power system. Upon the occurrence of a power swing condition, there exists an imbalance between generated and consumed active power for the system. In particular, upon the occurrence of a power swing condition, there is a sudden change of the electrical power demand for the system. On the other hand, the mechanical power input to the system generators remains relatively constant. As a result of the power swing condition, the system generator rotors may accelerate and oscillations in the rotor angles for the sytem generators may occur, which can translate into severe system disturbances.

Depending on the severity of the system disturbance(s) and the actions of the power system controls during a power swing, the system may remain stable and return to a new equilibrium state, having experienced what is referred to as a stable power swing. However, severe system disturbances can produce a large separation of system generator rotor angles, large swings of power flows, large fluctuations of voltages and currents, and eventually lead to a loss of synchronism between groups of system generators or between neighboring utility systems. This occurence is referred to as an unstable power swing.

Large power swings, whether stable or unstable, can cause undesirable results. In particular, large power swings can cause the impedance presented to a distance relay to fall within the operating characteristics of the relay, away from the pre-existing steady-state load condition, and cause the relay to actuate an undesired tripping of a system transmission line. The undesired operation of system relays during a power swing can aggravate further the power system disturbance and cause system instability, major power outages and/or power blackouts. This can cause an otherwise stable power swing to become an unstable power swing. It will therefore be understood that distance relays preferably should not operate during stable power swings to allow the power system to establish a new equilibrium state and return to a stable condition.

During an unstable power swing, two or more areas of a power system, or two or more interconnected networks, lose synchronism. Uncontrolled tripping of circuit breakers during an unstable power swing condition could cause equipment damage and pose a safety concern for utility personnel. Therefore, it is imperative that the asynchronous system areas be separated from each other quickly and automatically in order to avoid extensive equipment damage and shutdown of major portions of the power system. During an unstable power swing condition, a controlled tripping of certain power system elements is necessary in order to prevent equipment damage, widespread power outages, and to minimize the effects of the disturbance.

Ideally, the asynchronous areas should be separated in such locations as to maintain a load-generation balance in each of them. System separation does not always achieve the desired load-generation balance. In cases where the separated local area load is in excess of local area generation, some form of non-essential load shedding is necessary to avoid a complete blackout of the system area.

To protect the power system, distance relays have integrated numerous protection functions including power swing detection and responsive relay blocking functions and unstable power swing detection and responsive selective tripping or pole slipping functions. The main purpose of power swing detection and responsive relay blocking functions is to differentiate faults from power swings and block operation of distance or other relay elements during all power swing conditions (stable and unstable power swings). In other words, during a power swing, it is ordinarily desirable to prevent tripping of the power system elements.

Faults occurring during a power swing must however be detected and cleared with a high degree of selectivity and dependability. Therefore, in such situations, the utilized power swing detection and responsive relay blocking function should allow the distance relay elements to operate and clear any faults that occur in their zone of protection during a power swing condition.

Power swing blocking functions are designed to detect power swings, differentiate power swings from faults, and prevent distance relay elements from operating during power swing conditions. Power swing blocking functions prevent system elements from tripping at random and at undesired source voltage phase angle difference between system areas that are in the process of losing synchronism with each other.

Unstable power swing detection and responsive selective tripping functions are also available in distance relays. The main purpose of these functions is to detect an unstable power swing condition by differentiating between stable and unstable power swing conditions. Power system utilities designate certain points on their network as separation points allowing for separation of asynchronous system areas during unstable power swing conditions. During an unstable power swing condition and at the appropriate source voltage phase angle difference between asynchronous system areas, the unstable power swing detection and responsive selective tripping function initiates controlled tripping of appropriate breakers (or other system elements) at predetermined network locations, to uncouple asynchronous system areas quickly and in a controlled manner in order to maintain power system stability and service continuity. Distance relay elements prone to operate during unstable power swings should be inhibited from operating to prevent system separation from occurring at random and in locations other than preselected ones.

Power swing detection and responsive relay blocking elements conventionally monitor the rate of change of the positive sequence impedance to detect power swing conditions. The required settings for these elements can be difficult to calculate in many applications, particularly those where fast power swings can be expected. For these cases, extensive stability studies are required in order to determine the fastest rate of possible power swings.

Unstable power swing detection and responsive selective tripping functions also typically monitor the rate of change of the positive sequence impedance. The required settings for this function are also difficult to calculate and in most applications it is required to perform an extensive number of power system stability studies with different operating conditions. This is a costly exercise and one can never be certain that all possible scenarios and operating conditions were taken under consideration.

The difference in the rate of change of the impedance vector has been conventionally used to detect a stable or unstable power swing and block the operation of the appropriate distance protection elements before the impedance enters the protective relay operating characteristics because it is known that it takes a finite period of time for the torque angle of system generators to advance due to system inertias. In other words, the time rate of change of the impedance vector is slow during stable or unstable power swings, because it takes a finite period of time for the generator rotors to change position with respect to each other due to their large inertias. On the other hand, the time rate of change of the impedance vector is very fast during a system fault.

Actual implementation of measuring the impedance rate of change is normally performed though the use of two impedance measurement elements together with a timing device. If the measured impedance stays between the two impedance measurement elements for a predetermined time, then a power swing is detected and a relay blocking signal is generated to prevent operation of the appropriate distance relay elements.

These conventional protection functions are mostly based on measuring the positive-sequence impedance at a relay location. During normal system operating conditions, the measured impedance is the load impedance and its locus is away from the distance relay protection characteristics on the impedance plane well known by those skilled in the art. When a fault occurs, the measured impedance moves immediately from the load impedance location on the impedance plane to the location representative of that fault condition on the impedance plane. During a system fault, the rate of impedance change is primarily determined by the amount of signal filtering in the relay.

During a power swing, the measured impedance moves relatively slowly on the impedance plane. For a power swing, the rate of impedance change is determined by the slip frequency of an equivalent two-source system.

This difference of impedance rate of change during a fault and during a power swing is utilized in conventional power swing detection schemes to differentiate between a fault and a swing. Placing two concentric impedance characteristics, separated by impedance $\Delta Z$, on the impedance plane and using a timer to time the duration of the impedance locus as it travels between the characteristics is one manner used to make the differentiation. In that regard, if the impedance measured crosses the concentric characteristics within a predetermined period of time, then the event is deemed to be a system fault event. Conversely, if the impedance does not cross the concentric characteristics within the predetermined period of time, then the event is deemed to be a power swing.

Different impedance characteristics have been designed for power swing detection. These characteristics (identified as inner Z element and outer Z element) include the double blinders illustrated in FIG. 1, polygons illustrated in FIG. 2, concentric circles illustrated in FIG. 3, and lens characteristics illustrated in FIG. 4.

There are a number of issues that must be addressed to apply and set the power swing detection functions. To guarantee that there is enough time to carry out blocking of the appropriate distance relay elements following detection of a power swing, the power swing detection and responsive relay blocking function inner impedance (z) element must be positioned on the impedance plane outside the position of the largest distance relay protection characteristic on the impedance plane. Also, the power swing detection and responsive relay blocking function outer impedance (z) element must be positioned on the impedance plane at a position away from the position of the load region on the impedance plane to prevent power swing detection and responsive relay blocking logic operation caused by heavy loads, which would incorrectly cause blocking of the line mho tripping elements. These relationships among the impedance (z) measurement elements are illustrated in FIG. 2, using concentric polygons as power swing detection elements.

Those skilled in the art appreciate that these requirements are difficult to achieve in some applications depending on the relative line and source impedance magnitudes. It can be difficult to set the inner and outer power swing detection impedance (z) elements, and in certain circumstances incorrect relay blocking could occur.

Another shortcoming of conventional power swing detection schemes that measure the rate of change of the impedance is the determination and setting of the separation between the inner and outer impedance (z) elements and the determination and setting of the time period to be used to differentiate a fault from a power swing. These settings are difficult to calculate and depending on the power system under consideration, it may be necessary to run extensive system stability studies in order to calculate these settings.

Compounding matters further, the rate of slip between two system generators is a function of the accelerating torque and system inertias. In general, the slip cannot be determined without performing system stability studies and analyzing the angular relationships of system generators as a function of time to estimate an average slip in degrees/sec or cycles/sec. While this approach may be appropriate for systems having a slip frequency that does not change as a function of time, in many power systems, the slip frequency increases considerably after the first slip cycle and on subsequent slip cycles. In those instances, a fixed impedance separation between the inner and outer impedance (z) elements and a fixed time period for detection of a power swing might not be suitable to provide a continuous blocking signal to the mho distance elements.

Still another shortcoming of conventional power swing detection techniques is that they are very difficult to implement in complex power systems because of the difficulty in obtaining the proper source impedance values required to establish the inner and outer impedance (z) elements and the time period settings. In such power systems, the source impedances vary constantly due to network changes, for example due to additions of new system generators and other system elements. The source impedances could also change drastically during a major disturbance and during system conditions when the blocking functions are desired. Very detailed and extensive power system stability studies must be carried out, taking into consideration all contingency conditions in order to find the most suitable settings for the detection of the power swing.

Yet another shortcoming of conventional power swing detection and responsive relay blocking and unstable power swing detection and responsive selective tripping functions is that those functions are often combined together in a single logic structure within relays. This approach of combining the functions can present conflicting setting requirements if it is desired to apply both functions at the same transmission line location.

In view of the foregoing, it is desirable to provide a power system protection technique designed to protect against power swings occurring within the system.

It is also desirable to provide such a protection technique that separates the power swing detection and responsive relay blocking function from the unstable power swing detection and responsive selective tripping function. This will eliminate user confusion in the application of these relay functions and at the same time remove the conflicting setting requirements if it is desired to apply both functions in the same relay at the same transmission line location.

It is further desirable to eliminate user settings and the need for stability studies for the power swing detection and responsive relay blocking function.

It is still further desirable to provide for a power swing detection and responsive relay blocking technique that is independent of network parameters.

It is also desirable to provide for a power swing detection and responsive relay blocking technique that can be used effectively with long heavily loaded transmission lines of the type that present problems when using conventional techniques.

It is also desirable to provide for a power swing detection and responsive relay blocking technique that can detect three-phase faults that may occur during power swings and allow the protective relays to issue a tripping command and isolate the faulted power system element.

It is also desirable to provide for a power swing detection and responsive relay blocking technique that can track a power swing irrespective of the location of the apparent impedance in the complex plane.

It is still further desirable to remove the need for stability studies and simplify the settings for the unstable power swing detection and responsive selective tripping function when it is desired to trip on-the-way-out (TOWO).

It is yet further desirable to provide an option for the user to perform the unstable power swing detection and responsive selective tripping function on-the-way-in (TOWI).

These and other benefits of the preferred form of the inventive subject matter will become apparent from the following description. It will be understood, however, that a system and method could still appropriate the inventive subject matter claimed herein without having each and every one of these benefits, including those gleaned from the following description. The appended claims, not the benefits, define the exclusive subject matter and should be construed to the fullest extent permitted by law, including the applicable range of equivalency. Any and all benefits are derived from the preferred forms of the inventive subject matter, not necessarily from it in general.

BRIEF SUMMARY OF THE INVENTION

With regard to its most preferred aspects, a novel power swing detection and responsive relay blocking function has been designed. The power swing detection and responsive relay blocking function requires no user settings, is independent of network parameters and there is no need to perform any stability studies. The power swing detection and responsive relay blocking function is based on the positive-sequence swing-center voltage (SCV1) for the monitored power system. For this function, a starter zone is used that is based on the location of the calculated positive-sequence impedance (Z1) in the complex plane and the magnitude of the positive-sequence swing-center voltage (SCV1), thereby not requiring user settings to set the starter zones. A swing signature detector (SSD) using information stored in three-cycles distinguishes between a fault and a power swing at the moment just before the outermost zone desired to be blocked is about to pickup. A dependable power swing detection logic (DPSB) allows the detection of incipient power swings occurring immediately after a fault has been cleared from the power swings. A slope detector logic (SD) uses the first and second time derivatives of the positive-sequence swing-center voltage (SCV1) and the magnitude of the SCV1 to detect power swings anywhere in the complex impedance (Z) plane. The second time derivative of the positive-sequence swing-center voltage (SCV1) is used to increase the reliability of power swing detection and the detection of three-phase faults occurring during a power swing condition. The power swing detection and responsive relay blocking function detects three-phase faults during a power swing condition in a manner that is fast and independent of the power swing frequency.

A novel unstable power swing detection and responsive selective tripping function has also been designed. With regard to the most preferred aspects of this function, there is no need to perform any stability studies if it is desired to trip on-the-way-out (TOWO). The unstable power swing detection and responsive selective tripping function is independent from the power swing detection and responsive relay blocking function, thereby permitting application of both functions at the same location without any conflicting setting requirements and user confusion.

The unstable power swing detection and responsive selective tripping function offers the option of trip on-the-way-out (TOWO) during the first slip cycle, TOWO after a set number of slip cycles have occurred, and trip on-the-way-in (TOWI) before completion of the first slip cycle. No timers are required for the unstable power swing detection and responsive selective tripping function. The unstable power swing detection and responsive selective tripping function monitors and tracks the positive-sequence impedance (Z1) trajectory as it moves in the complex impedance (z) plane. The settings for the resistive and reactive blinders (preferably four resistive and four reactive blinders) are easy to calculate and the resistive blinder settings for the trip on-the-way-out (TOWO) option can be self-calculated by the relay based on the line positive-sequence impedance (Z1). Provided a power swing has been detected, an unstable power swing will be detected if the tracked impedance trajectory moves from right-to-left or left-to-right across the entire selected complex plane.

BRIEF DESCRIPTION OF THE SEVERAL DRAWINGS

In the foregoing background and following detailed description, reference has been and will be made to the following figures, in which like reference numerals refer to like components, and in which.

Figure 9:
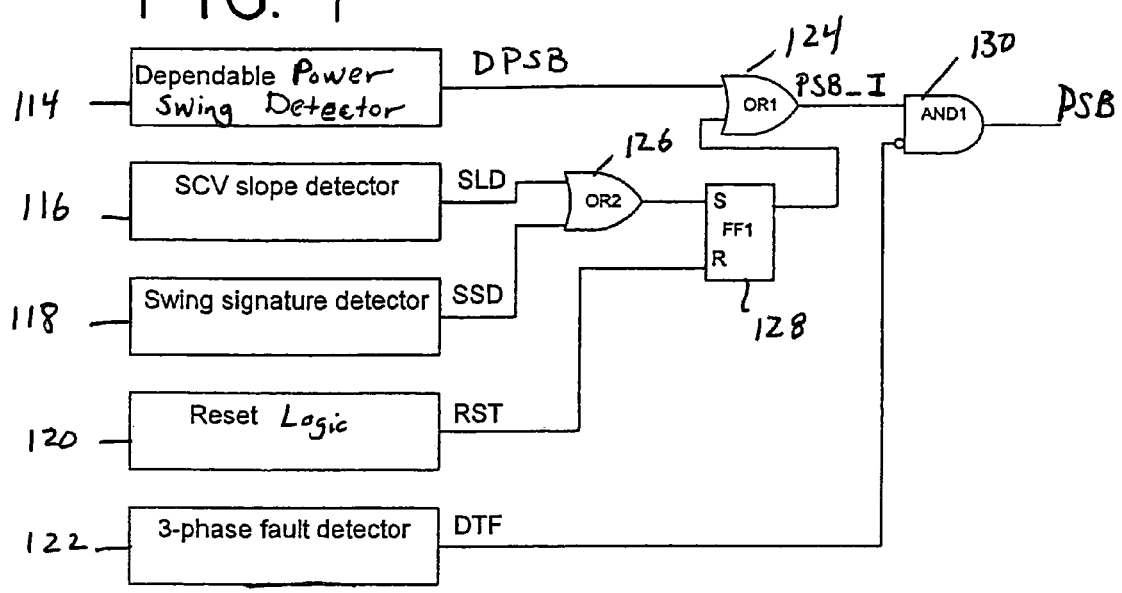
FIG. 9 is a block diagram representing a no-setting power swing detection system designed in accordance with the principles of the present invention.
Figure 14:
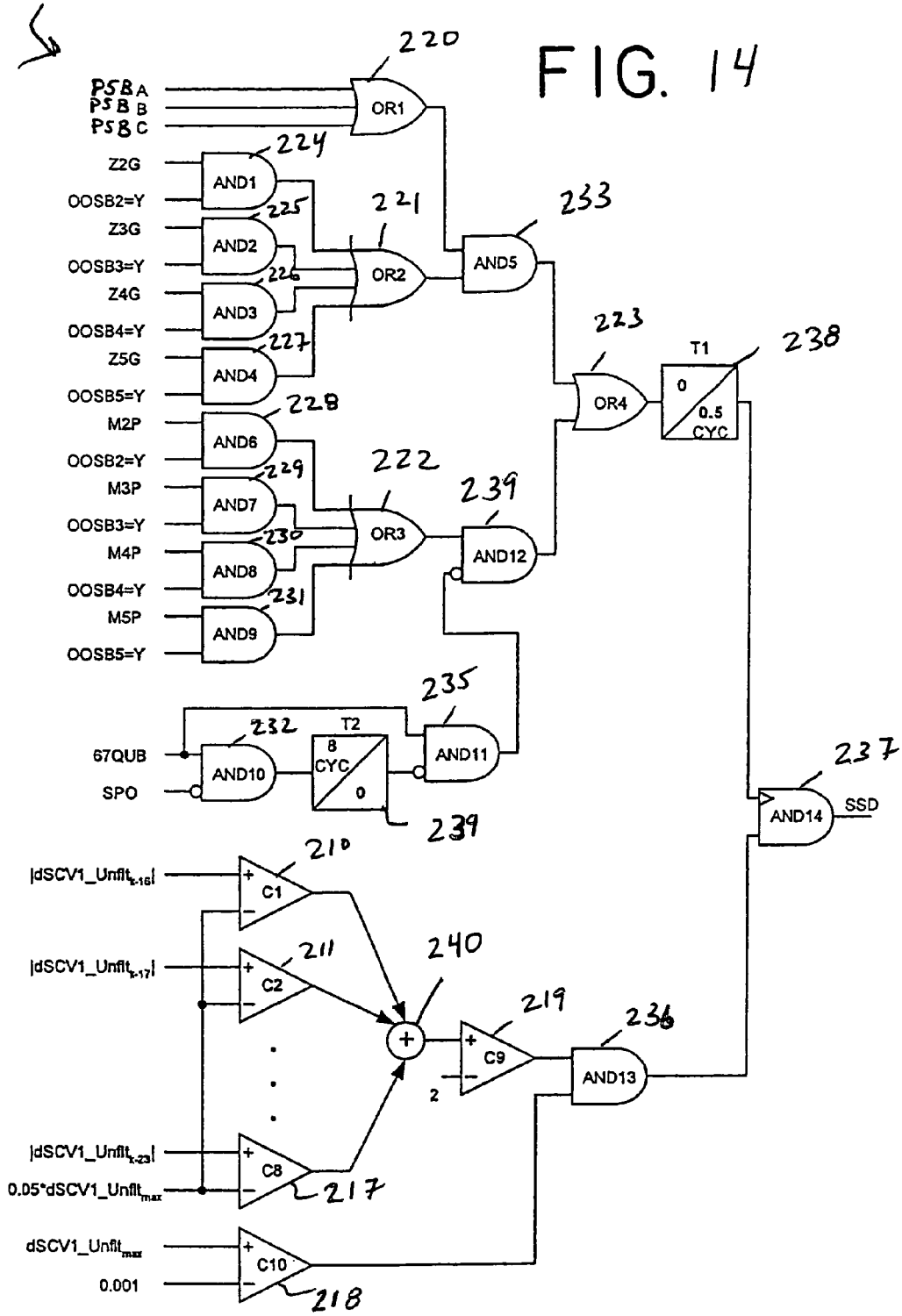
Figure 15:
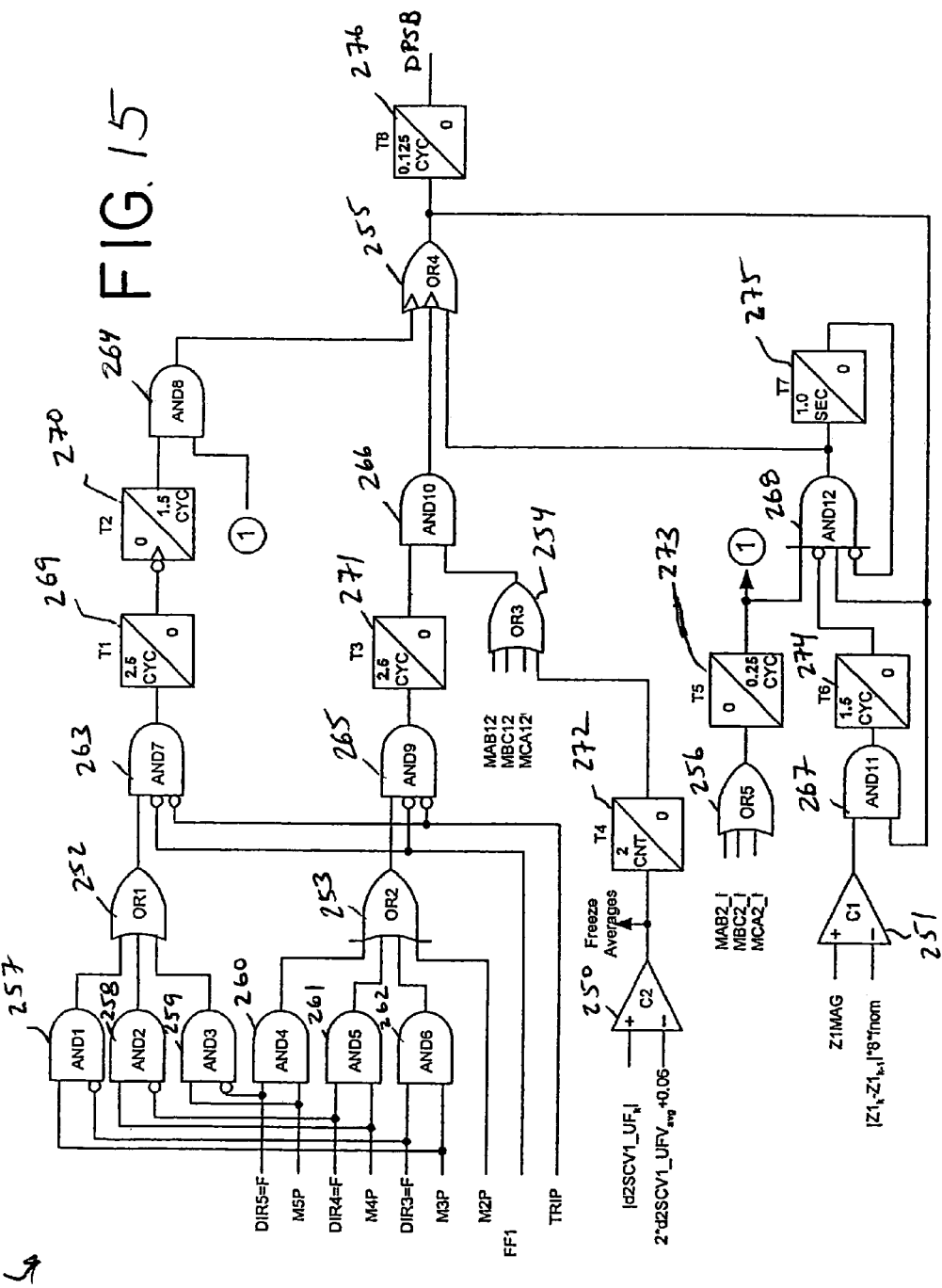
Figure 16:
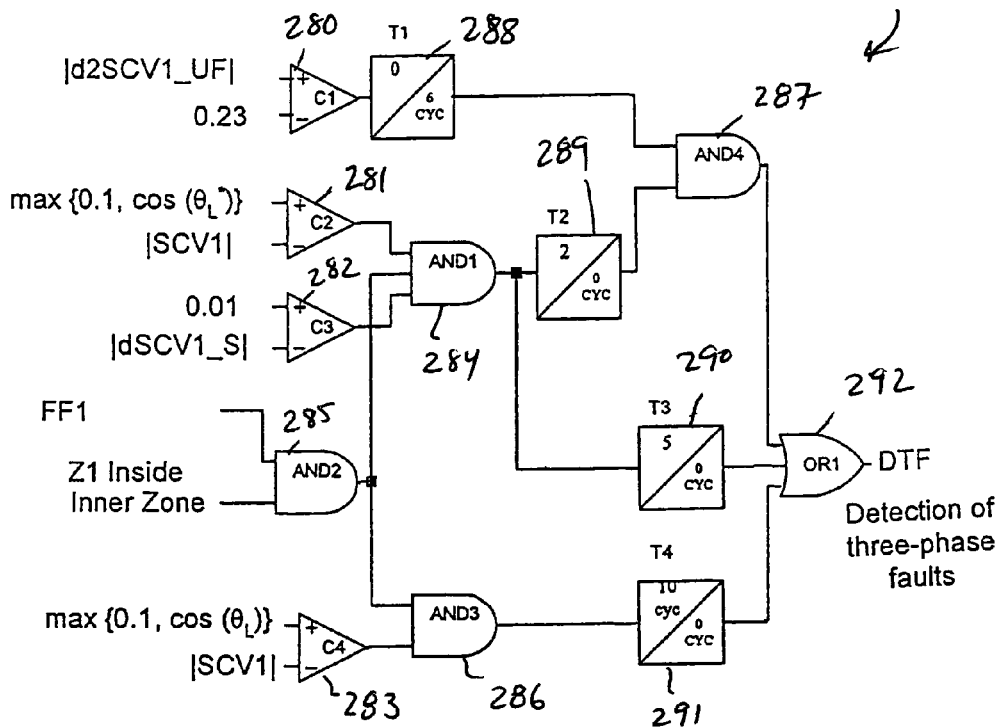
Figure 17:
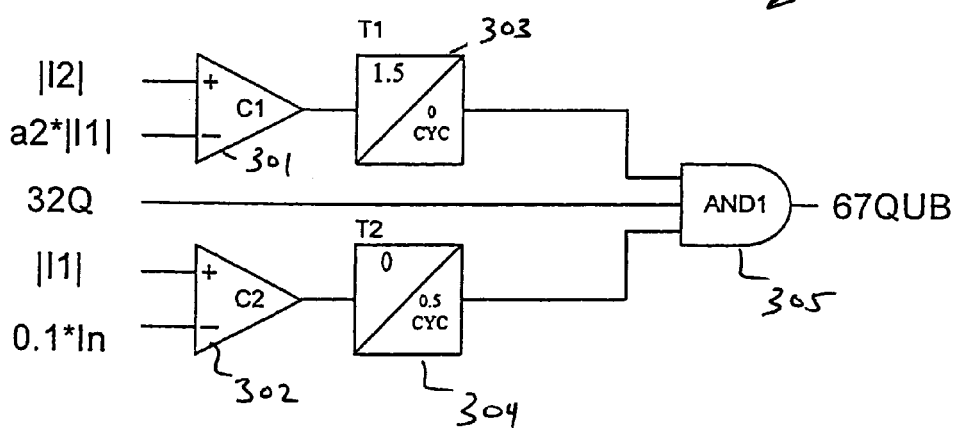
Figure 18:
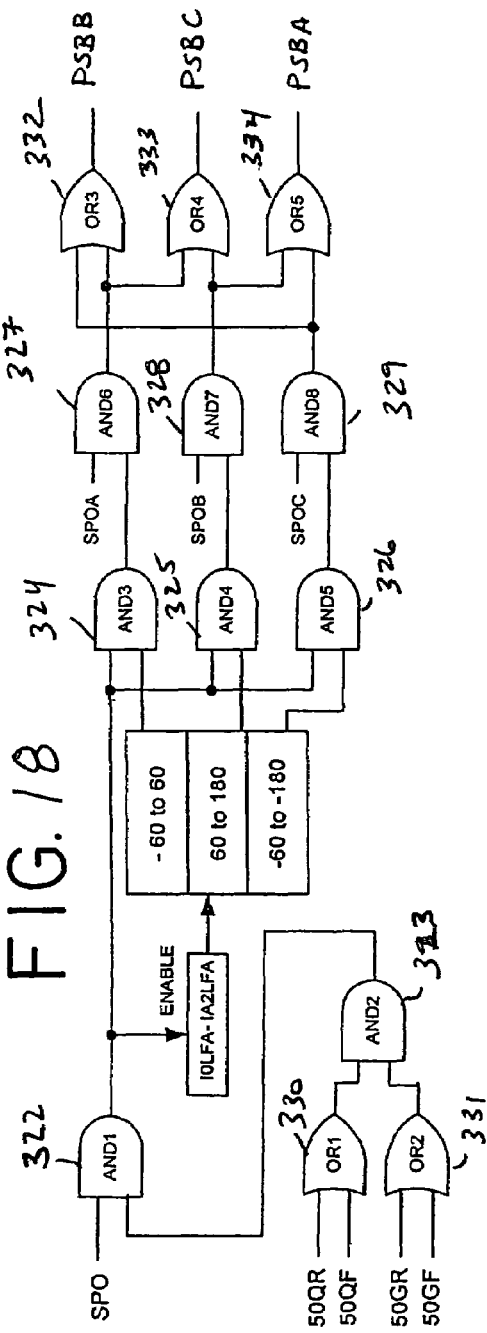
Figure 20:
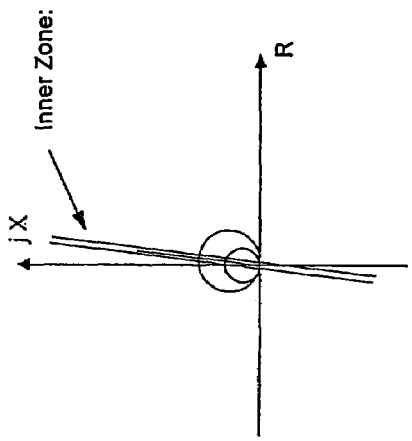
Figure 19:
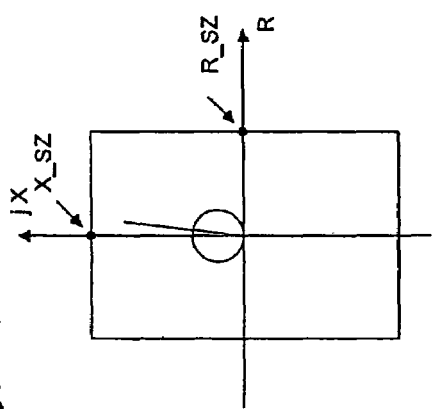
Figure 21:
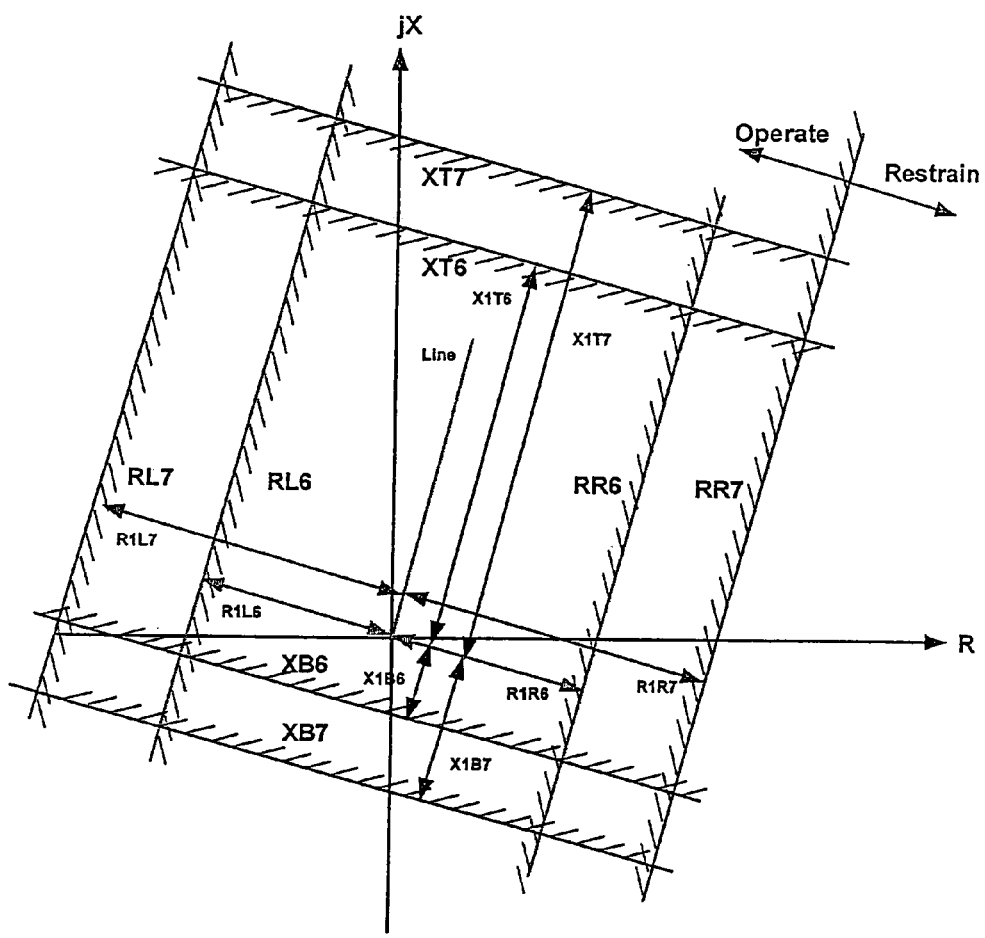
Figure 22:
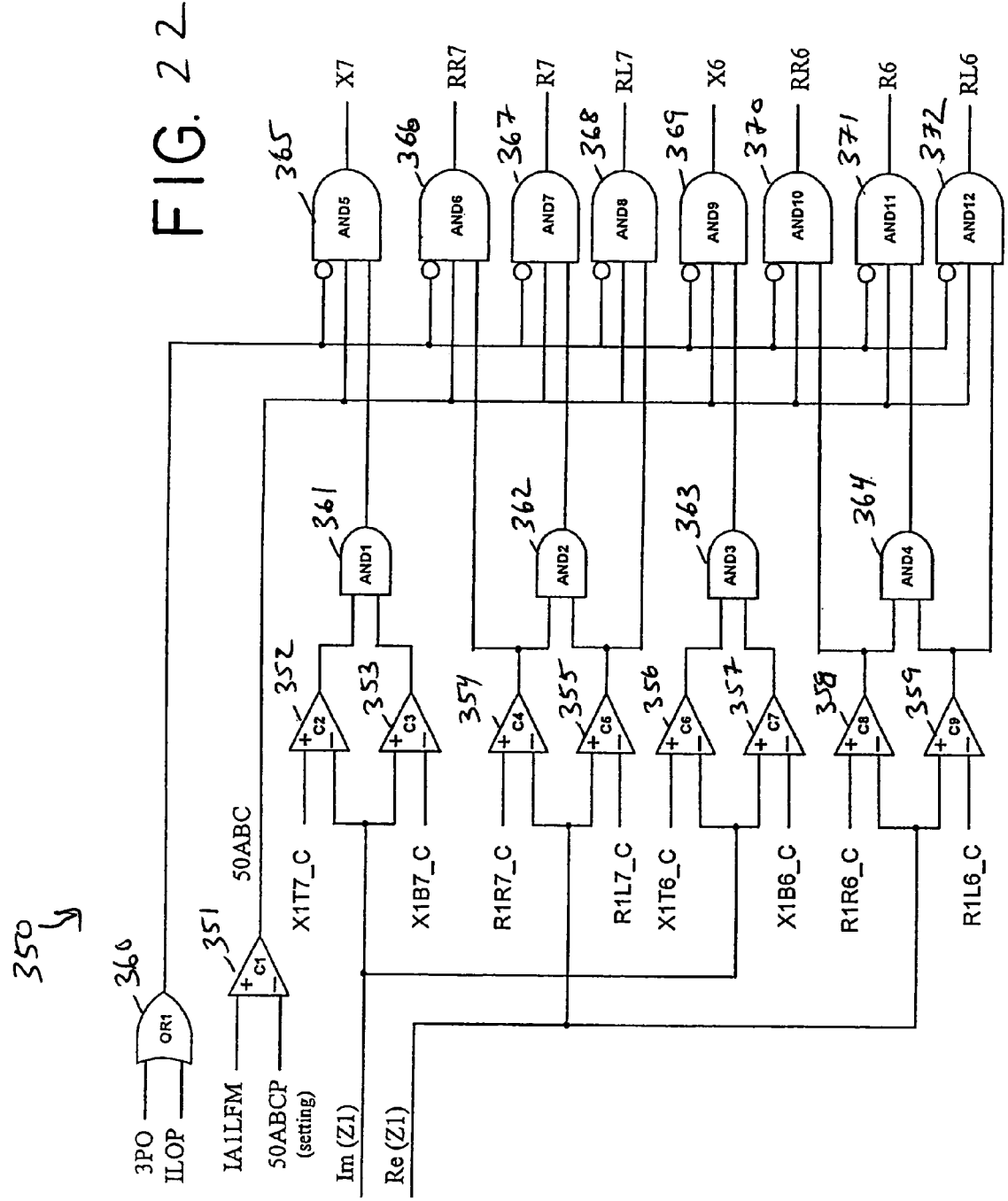
Figure 23:
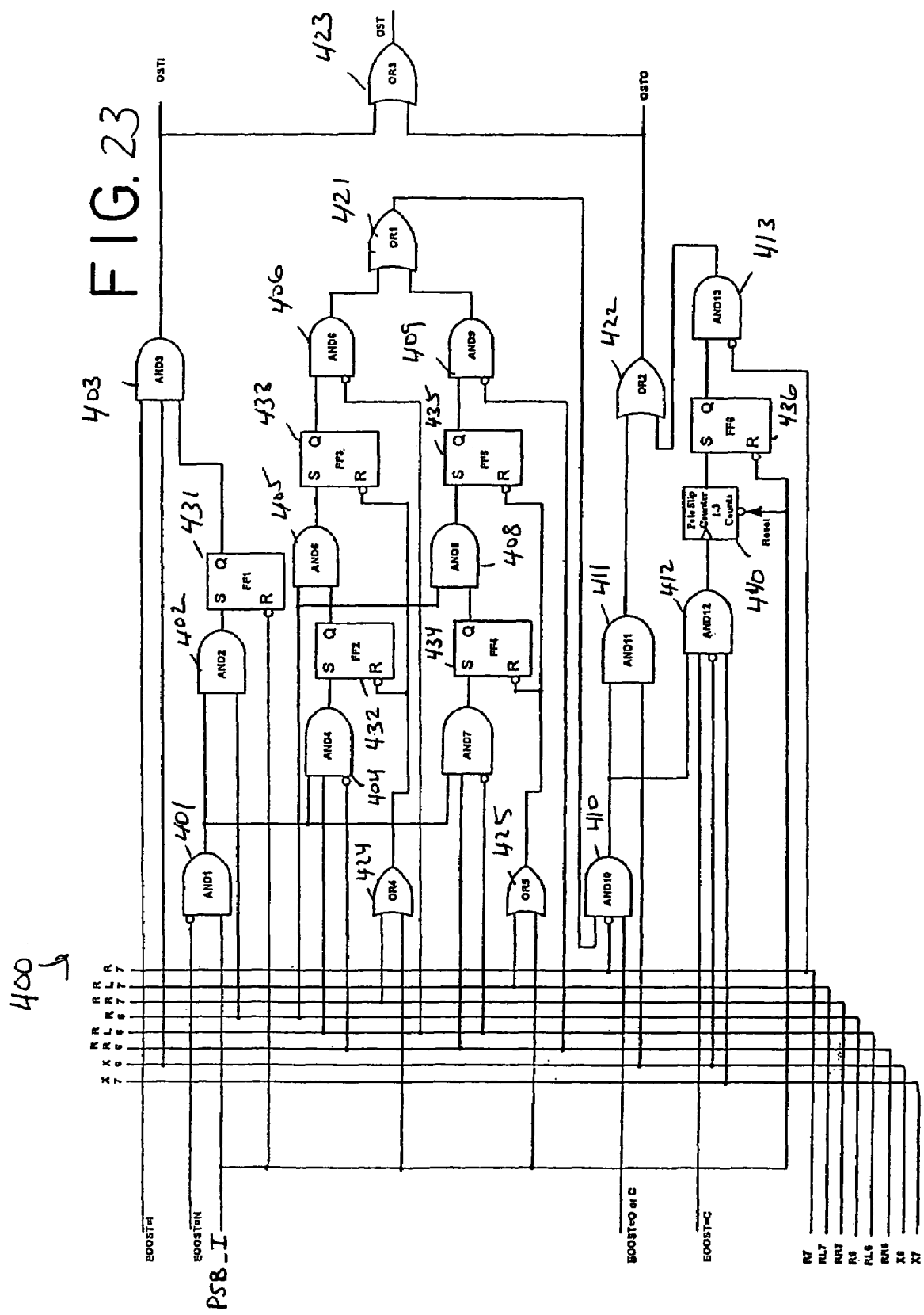

FIG. 14 a circuit diagram representation of the swing signature detector logic illustrated in FIG. 9;

FIG. 15 is a circuit diagram representation of the dependable power swing detector illustrated in FIG. 9;

FIG. 16 is a circuit diagram representation of the three-phase fault detector illustrated in FIG. 9;

FIG. 17 is a circuit diagram representation of system unbalanced protection logic designed to detect an unbalanced system condition in the relay forward direction;

FIG. 18 is a circuit diagram representation of a circuit designed to enable blocking of the ground distance elements during a single pole open condition;

FIG. 19 is a graphical representation used to define a starter zone for the positive sequence impedance;

FIG. 20 is a graphical representation used to define the inner zone for the positive sequence impedance;

FIG. 21 is a graphical representation of the resistive and reactive blinders used for the unstable power swing detection and responsive selective tripping or pole slipping function;

FIG. 22 is a circuit diagram representation of the logic used to define specific zones within FIG. 21; and, FIG. 23 is a circuit diagram for a circuit used to carry out the unstable power swing detection and selective relay tripping function.

DETAILED DESCRIPTION OF THE INVENTION

For the present invention, the power swing detection and responsive relay blocking function is based upon a power system quantity, the positive-sequence swing-center voltage (SCV1), which provides the benefits associated with requiring no user settings. Preferably, a suitable approximation for this quantity is used. The approximation is referred to as the Vcosϕ and it is believed it was first introduced and used for power swing detection by Illar et al. in their U.S. Pat. No. 4,426,670. Vcosϕ is an estimate of the swing-center voltage (SCV), and in a purely inductive two-machine system, it is identical to the swing-center voltage.

The swing-center voltage is uniquely suited for effectively carrying out power swing detection because it is independent of the system source and line impedances, unlike other power system quantities such as the resistance and its rate of change or the real power and its rate of change, which depend on the line and system source impedances and other system parameters. Consequently, the swing-center voltage can provide for a no-setting power swing detection and responsive relay blocking function.

The swing-center voltage is also bounded with a lower limit of zero and an upper limit of one per unit, regardless of system impedance parameters. This contrasts to other electrical system quantities, such as impedance, currents, and active or reactive powers, whose limits depend on a variety of system parameters. Furthermore, the magnitude of the swing-center voltage directly relates to δ, the angle difference of two system sources.

Swing center voltage (SCV) is defined as the voltage at the location of a two-source equivalent system where the voltage value is zero when the angles between the two sources are one hundred eighty degrees apart. The swing center voltage will now be derived from a two-source equivalent system.

Figure 2:
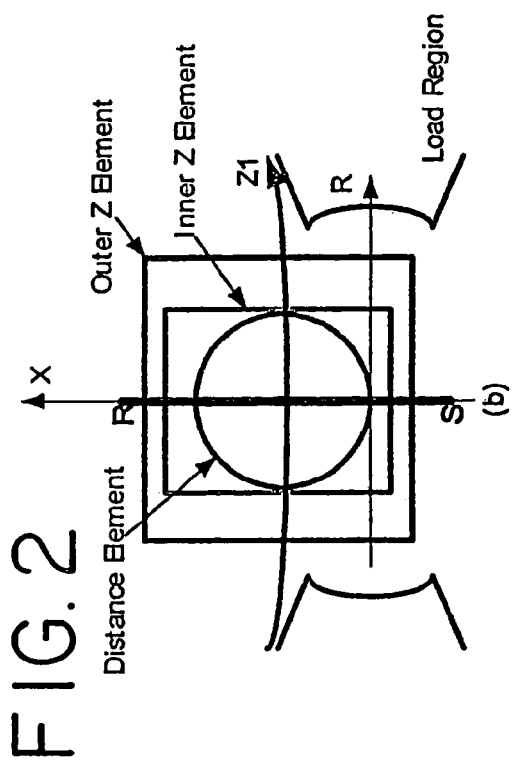
FIG. 2 is a diagrammatic view of an impedance plane with a second set of impedance elements for power swing detection.
Figure 4:
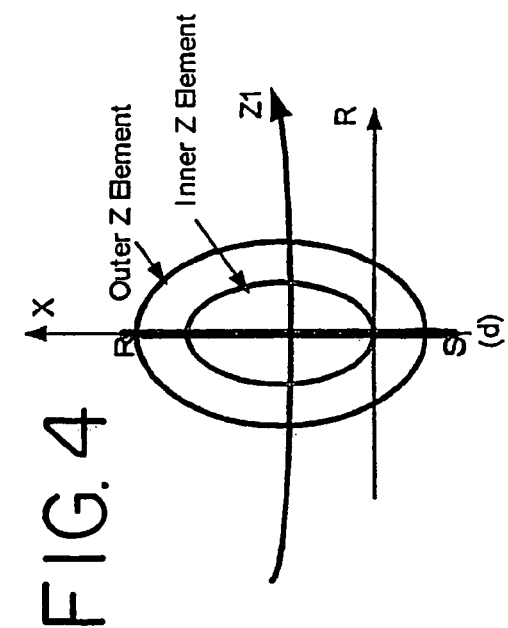
FIG. 4 is diagrammatic view of an impedance plane with a fourth set of impedance elements for power swing detection.
Figure 1:
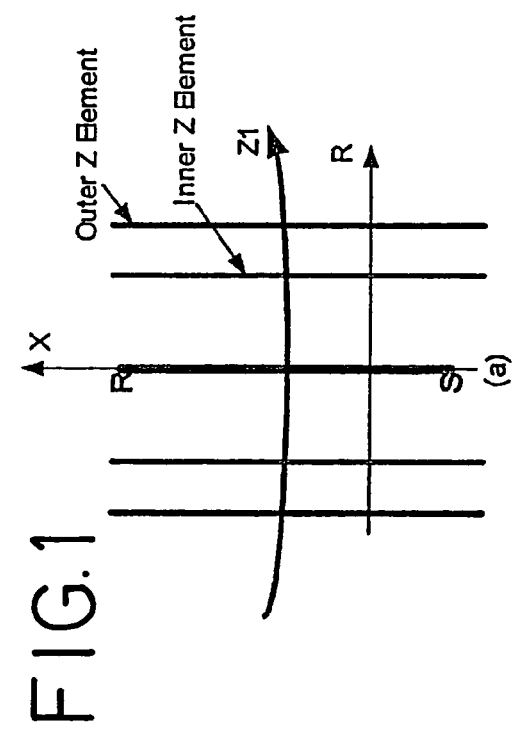
FIG. 1 is a diagrammatic view of an impedance plane with a first set of impedance elements for power swing detection.
Figure 3:
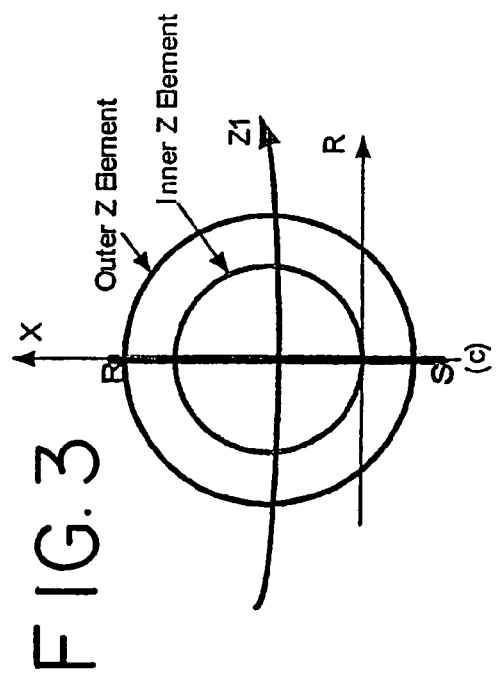
FIG. 3 is diagrammatic view of an impedance plane with a third set of impedance elements for power swing detection.
Figure 5:
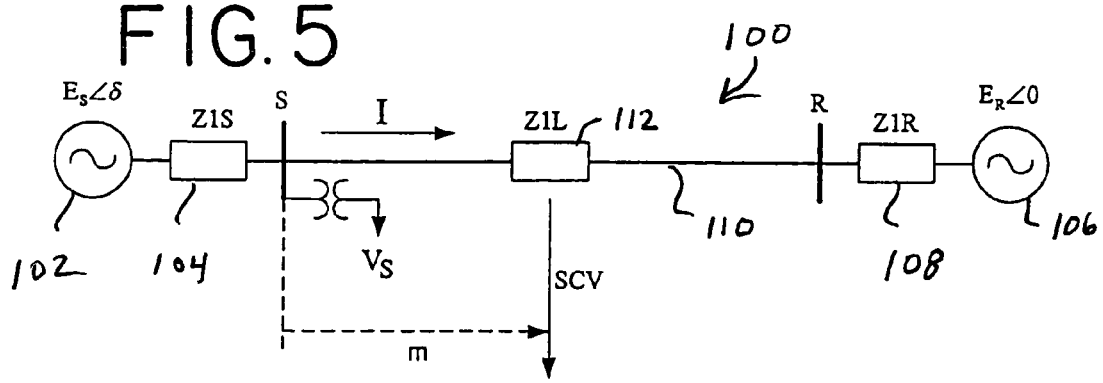
FIG. 5 is a circuit diagram representing a two-source equivalent circuit of a power system.

FIG. 5 illustrates a two-source equivalent circuit 100 for a power system. As shown, circuit 100 includes a local source 102 having a local source impedance 104, a remote source 106 having a remote source impedance 108, and a line 110 having a line impedance 112. The machine angle differential between local source 102 and remote source 106 is represented as δ, or in the case where the differential varies as a function of time, δ(t). When the machine angle differential between the two sources 102, 106 swings apart to one hundred eighty degrees, there is a location on the line 110 where the voltage will be zero. The voltage at this location, as a function of the machine angle differential (δ(t)) and as a function of time (t), is defined as the swing-center voltage (SCV(t)).

Allowing the source voltage for local source 102 to be, $$e_s(t) = \sqrt{2} E_S \sin(\omega t + \delta(t))$$

and allowing the source voltage for the remote source 106 to be, $$e_R(t) = \sqrt{2} E_R \sin(\omega t)$$

and assuming the swing-center voltage location is a distance referenced by m in FIG. 5 from the local measurement terminal S, the swing-center voltage takes the following value when the local source 102 acts alone, $$u_{C|S}(t) = \frac{Z1R + (1-m)Z1L}{Z1S + Z1L + Z1R} \sqrt{2} E_S \sin(\omega t + \delta(t))$$

When the remote source 106 acts alone, the swing-center voltage equals, $$u_{C|R}(t) = \frac{Z1S + mZ1L}{Z1S + Z1L + Z1R} \sqrt{2} E_R \sin(\omega t)$$

Taking into consideration the definition of the swing-center voltage, the following equation can be derived, $$\frac{Z1S + mZ1L}{Z1S + Z1L + Z1R} E_R = \frac{Z1R + (1-m)Z1L}{Z1S + Z1L + Z1R} E_S$$

through voltage division. The location of the swing-center, m, can be calculated from the preceding equation. Using the superposition principle, the swing-center voltage can be expressed as a linear combination of voltage drops acting by the two sources 102, 106 individually. The swing-center voltage (SCV(t)) therefore equals, $$SCV(t) = u_{C1S} + U_{C1R} = \sqrt{2} U_{C0}[\sin(\omega t + \delta(t)) + \sin(\omega t)]$$

In this equation, $U_{C0}$ represents the quantity given in prior equation. Using the trigonometric equality.

$$\sin A + \sin B = 2\sin\frac{A}{2}\cos\frac{A}{2} + 2\sin\frac{B}{2}\cos\frac{B}{2}$$

$$= 2\left(\sin^2\frac{B}{2} + \cos^2\frac{B}{2}\right)\sin\frac{A}{2}\cos\frac{A}{2} +$$

$$2\left(\sin^2\frac{A}{2} + \cos^2\frac{A}{2}\right)\sin\frac{B}{2}\cos\frac{B}{2}$$

$$= 2\left[\sin\frac{A}{2}\cos\frac{B}{2} + \sin\frac{B}{2}\cos\frac{A}{2}\right] \cdot$$

$$\left[\cos\frac{A}{2}\cos\frac{B}{2} + \sin\frac{A}{2}\sin\frac{B}{2}\right]$$

$$= 2\sin\left(\frac{A+B}{2}\right) \cdot \cos\left(\frac{A-B}{2}\right)$$

the swing center voltage can be re-written as follows:

$$SCV(t) = 2\sqrt{2} \, U_{C0}\sin\left(\omega t + \frac{\delta(t)}{2}\right) \cdot \cos\left(\frac{\delta(t)}{2}\right)$$

with the assumption that both sources 102, 106 have an equal magnitude, E, it can be verified the $U_{C0} = E/2$. Under this equal magnitude assumption, the swing-center voltage can be represented as follows:

$$SCV(t) = \sqrt{2} \, E\sin\left(\omega t + \frac{\delta(t)}{2}\right) \cdot \cos\left(\frac{\delta(t)}{2}\right)$$

Figure 6:
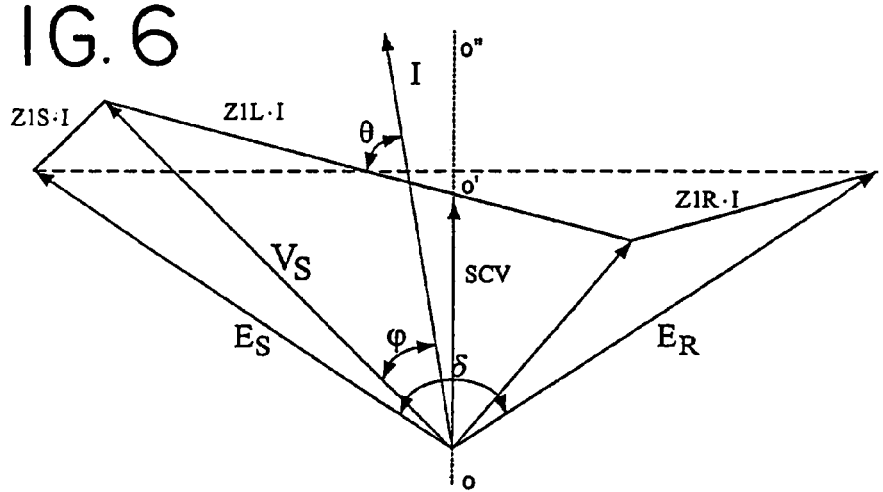
FIG. 6 is a voltage phasor diagram for the two-source equivalent circuit of a power system shown in FIG. 5.

FIG. 6 illustrates the voltage phasor diagram of the general two-source system illustrated in FIG. 5. As shown, the swing center voltage (SCV) is represented as the phasor extending from origin o to the point o'. When a two-source system illustrated by FIG. 5 loses stability and a power swing condition occurs after some disturbance, the angle difference of two sources, $\delta(t)$, will increase as a function of time. In the equation set forth above, SCV(t) is the instantaneous swing center voltage. SCV(t) is a typical magnitude-modulated sinusoidal waveform. The first sine term is the base sinusoidal wave, or the carrier, with an average frequency of $$\omega + \frac{\delta(t)}{2}.$$

The second term is the cosine magnitude modulation.

Figure 7:
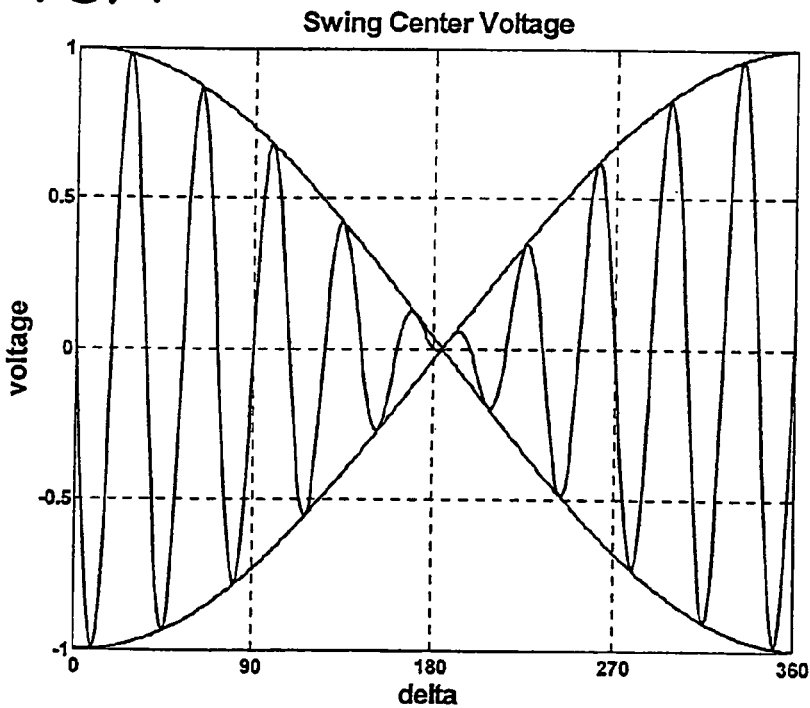
FIG. 7 is a graphical representation of a positive-sequence swing center voltage.

FIG. 7 illustrates a representation of a positive-sequence swing center voltage having a given average frequency and a constant slip frequency. When the frequency of a sinusoidal input is different from that assumed in its phasor calculation as is in the case of a power swing condition, oscillations in the phasor magnitude result. However, the magnitude calculation in FIG. 7 is smooth because the positive-sequence quantity effectively averages out the magnitude oscillations of individual phases, as will be appreciated by those skilled in the art.

As shown in FIG. 7, the magnitude of the swing center voltage changes between zero and one per unit of system nominal voltage. The voltage magnitude is forced to zero every given time period based upon the given slip frequency. The carrier in adjacent modulation cycles is similar, but its instantaneous values have opposite signs because the modulation frequency is half of the slip frequency.

Figure 8:
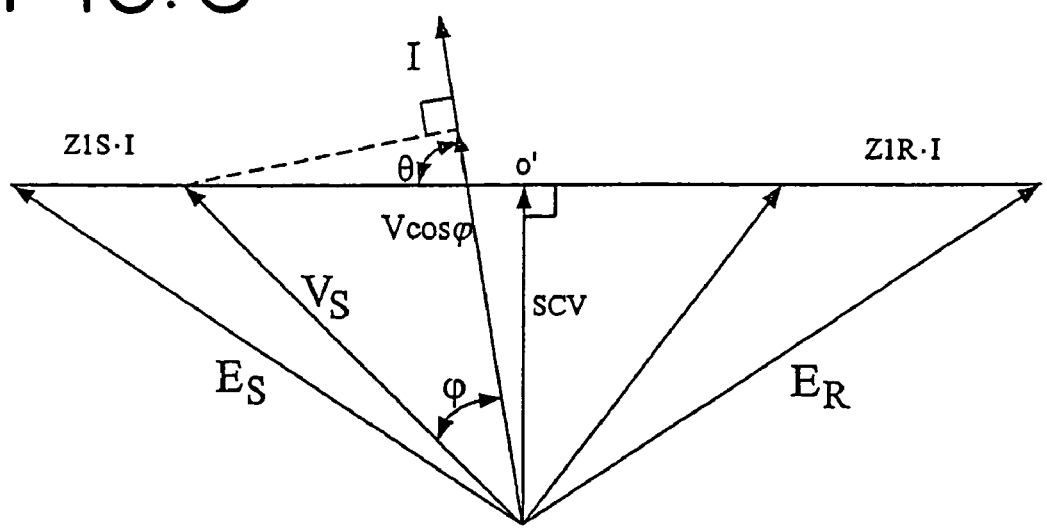
FIG. 8 is a phasor diagram directed to an approximation of the positive-sequence swing center voltage.

Preferably, the present invention utilizes the following approximation of the swing center voltage using locally available quantities:

SCV≈|$V_S$|·cos φ, where |$V_S$| is the magnitude of the local measured voltage, and φ is the angle difference between the phasor representation of the local source voltage $V_S$ and the phasor representation of the local current I, as shown in the phasor diagram of FIG. 8. As further illustrated by FIG. 8, the approximation of the swing center voltage is a projection of the local source voltage phasor representation onto the axis of the current phasor representation. For a homogeneous system with the system impedance angle θ close to 90°, the above approximation of the swing center voltage is sufficiently accurate. Moreover, for the purpose of power swing detection, it is the rate of change of the swing center voltage that provides the primary means of detection. Therefore, some differences in magnitude between the true system swing center voltage and its approximation made using locally measured values has little impact in detecting power swings.

For purposes of this invention, it will be appreciated that either the true swing center voltage or the approximation set forth above can be used, although it will be understood that use of the approximation is more practical. The two are used herein interchangeably and reference to swing center voltage in the claims shall be construed to cover both the true swing center voltage and the approximation thereof.

From the preceding equations, the relation between the SCV and the phase angle difference δ of two source voltage phasors can be simplified to:

$$SCV1 = E1 \cdot \cos\left(\frac{\delta}{2}\right)$$

In this equation, E1 represents the positive-sequence source magnitude equal to $E_{S1}$ that is assumed to be also equal to $E_{R1}$. SCV1 in the equation represents the positive-sequence swing-center voltage, used for power swing detection due to its desired smooth magnitude during the occurrence of a power swing condition. The absolute value of the swing center voltage is at its maximum when the angle between the two sources 102, 106 (FIG. 5) is zero and is at its minimum or zero when the angle is one hundred eighty degrees. A power swing can be detected then by evaluating the rate of change of the swing-center voltage. The time derivative of the positive-sequence swing center voltage (SCV1) then becomes:

$$\frac{d(SCV1)}{dt} = -\frac{E1}{2}\sin\left(\frac{\delta}{2}\right)\frac{d\delta}{dt}$$

This equation provides the relation between the rate of change of the swing center voltage and the slip frequency of the two source system (dδ/dt). As will be appreciated, the derivative of the swing center voltage is independent from the network impedances and is at its maximum value when the angle between the sources is one hundred eighty degrees. On the other hand, when the angle between the two sources is zero, the rate of change of the swing center voltage is at its minimum, specifically equal to zero.

Two differences exist between the true system swing-center voltage and its approximation arrived at by measuring local values. First, when there is no load flowing on a transmission line, the current from a line terminal is essentially the line charging current that leads the local source voltage by approximately ninety degrees. In this case, the approximation of the swing center voltage is close to zero and does not represent the true system swing-center voltage. Second, the approximated swing center voltage has a sign change in its value when the phase difference angle δ of two equivalent sources goes through zero degrees. The true system swing-center voltage does not have this discontinuity. These differences, however, do not impact the ability of the approximated swing center voltage to be used for power swing detection, because such detection is primarily based on the rate of change of the swing center voltage.

FIG. 9 illustrates a block diagram representing a no-setting power swing detection technique that, in turn, can be used to cause relay blocking. While this invention is described and illustrated in terms of being implemented using logic "gates" and other electronic components, it will be understood that a preferred implementation of the present invention is carried out by software or firmware. The logic "gates" illustrated in this application are therefore functions and operations that may be performed by various implementations known in the art, such as solid state electronic circuits, software code and/or firmware, for example. Accordingly, the description herein shall constitute and shall be understood to be a description of these various means of implementing the noted logic for carrying out the subject invention.

Referring back to FIG. 9, as shown, a dependable power swing detector 114, a swing-center voltage slope detector 116, and a swing signature detector 118 are used to detect the occurrence of a power swing condition. Also included are reset logic 120 and three-phase fault detector 122. Upon detection of a power swing condition, the power swing detection signal (PSB) is generated and may be used to enable a relay blocking function.

In operation, the swing-center voltage slope detector 116 monitors the absolute value of the positive-sequence swing-center voltage time rate-of-change (|d(SCV1)/dt|), the magnitude of the positive-sequence swing-center voltage (|SCV1|), and the output of a discontinuity detector. Upon the detection of a power swing condition by measurement of a sufficiently large value of |d(SCV1)/dt|, the swing-center voltage slope detector 116 generates a slope detector output SLD, which in turn causes the generation of the power swing detection signal (PSB) through OR logic or gate 124.

Slope detector 116 will produce an output signal SLD only when the absolute value of the time rate-of-change of the positive-sequence swing center voltage is within a predetermined range defined by maximum and minimum thresholds, the magnitude of the positive-sequence swing center voltage is correspondingly within a predetermined range defined by maximum and a minimum threshold values, and the positive-sequence impedance measured by the distance relay is within a predetermined starter zone. The output SLD of slope detector 116 is blocked any time the absolute value of the time rate-of-change of the positive-sequence swing center voltage exceeds its predetermined maximum threshold or the absolute value of the discontinuity detector exceeds a predetermined maximum threshold.

The minimum and maximum thresholds for the rate-of-change of the positive-sequence swing center voltage determine the measurement interval of the slip frequency for a classical two-source equivalent system model, such as that illustrated in FIG. 5. Preferably, these maximum and minimum thresholds are set with a security factor that guarantees that a slip frequency between 0.1 to 7 Hz will be covered.

Slope detector 116 is used to detect the majority of the occurrences of power swing conditions. However, in certain circumstances, slope detector 116 may not operate. For this reason, slope detector 116 is supplemented with the dependable power swing detector 114 and the swing signature detector 118.

The swing signature detector 118 is used to distinguish between a power swing and a real fault at the moment the outermost distance element to be blocked by the power swing detection picks up. Ordinarily, the slope detector 116 will detect a power swing first and will cause the power swing detection signal (PSB) to be generated. The PSB signal in turn will block the mho fault detectors and the swing signature detector 118 logic will not be processed.

In operation, the swing signature detector 118 preferably continuously stores the absolute value of the first-order derivative of the positive-sequence swing center voltage in a three-cycle buffer memory for a predetermined period of time constituting a few cycles. The maximum value of this buffer memory is then established. If the detected fault is a real fault, this slope maximum value will be very high because a discontinuity has occurred in the positive-sequence swing center voltage waveform. Preferably, eight of the older, stored samples are then compared to this maximum value. If the fault is real, the eight samples used for comparison will be below a variable threshold that is proportional to the slope maximum value. If, on the other hand, the fault is due to a power swing, no discontinuity will appear in the buffer and all of the compared old samples will be above the same variable threshold, causing the swing signature detector 118 to assert a signal at its output SSD and, in turn generate the power swing detection signal PSB through OR logic or gate 126.

The dependable power swing detector 114 will cause the power swing detection signal PSB to be generated in situations where neither the slope detector 116 nor the swing signature detector 118 can detect a power swing fast enough. An example of such circumstances is when a power swing condition occurs immediately following the clearance of a lasting external fault. Under circumstances such as this, the dependable power swing detector 114 will assert a temporary signal at its output DPSB, causing the power swing detection signal PSB to be generated through OR logic or gate 124. The dependable power swing detector 114 will assert a signal at its output DPSB for a predetermined period of time that will permit the slope detector 116 to detect the occurrence of a power swing condition. Thus, the dependable power swing detector 114 compensates for the pickup delay of the slope detector 116.

Reset logic 120 is used to reset the power swing detection signal PSB and thereby disenable the responsive relay blocking function upon recession of the power swing condition. Recession of the power swing condition is primarily detected because the rate-of-change of the positive-sequence swing center voltage signal falls to a very small value. In response, the reset logic 120 asserts a signal at its output RST, which is sent to the reset terminal of a set/reset flip-flop 128, as shown in FIG. 9. The set terminal of flip flop 128 is fed by the output of OR logic or gate 126, which is enabled when either of the slope or swing signature detectors 116, 118 are activated. The output terminal of flip flop 128 is coupled to one of the inputs for OR logic or gate 124.

The three-phase detector 122 generates a signal at its output DTF upon detection of a three-phase fault on a transmission line during a power swing. Consequently, the power swing detection signal PSB is blocked from being generated at AND logic or gate 130. In turn, the relay blocking function is disenabled. The use of the three-phase detector 122 is possible because if a three-phase fault occurs on a transmission line during a power-swing, a discontinuity will be present on the corresponding positive-sequence swing center voltage waveform. This discontinuity can be detected by monitoring and detecting when the positive-sequence swing center voltage and its time rate-of-change are relatively very low, and when its second derivative is relatively high. This permits the three-phase fault detector 122 to be very fast and independent from the swing speed.

A starter zone is preferably used with the power swing detection and responsive relay blocking function, allowing the power swing detection signal PSB to be generated only when the positive sequence impedance Z1 has a trajectory on the impedance plane with a chance to cross any of the relay operating characteristics during a power swing. Advantageously, with the present invention, the area covered by this preferred starter zone is not critical and can be defined to be a rectangle, the dimensions of which are automatically set so that the zone will encompass all of the relay operating characteristics that must be blocked during a stable power swing condition. The starter zone will preferably also encompass the largest relay operating characteristic used in the unstable power swing detection and tripping logic, if a user enables that function.

During the occurrence of a power swing condition and upon the generation of the power swing detection signal PSB, only phase-faults are blocked by the PSB signal and prevent relay activation. Ground-faults are not blocked by the power swing detection signal PSB because a power swing is a three-phase balanced phenomenon. Therefore, preferably, three-phase and phase-to-phase faults are detected so that the relay blocking function can be disabled, allowing such faults to be cleared during the occurrence of the power swing. In order to detect phase-to-phase faults, a directional overcurrent element based on a negative-sequence directional element can be used.

If a power swing is detected during an open-pole situation, the ground-faults detector is preferably blocked because, under these circumstances, the power swing is not balanced. Detection of any subsequent fault is important and can be carried out by monitoring the phasor angle ratio of the zero-sequence current over the negative-sequence current. For example, if phase-A is open, the angle ratio normally lies between −60° and 60°. If a fault occurs on phase-B or phase-C, or both, the relation no longer holds and the relays would be allowed to clear such faults.

Figure 10:
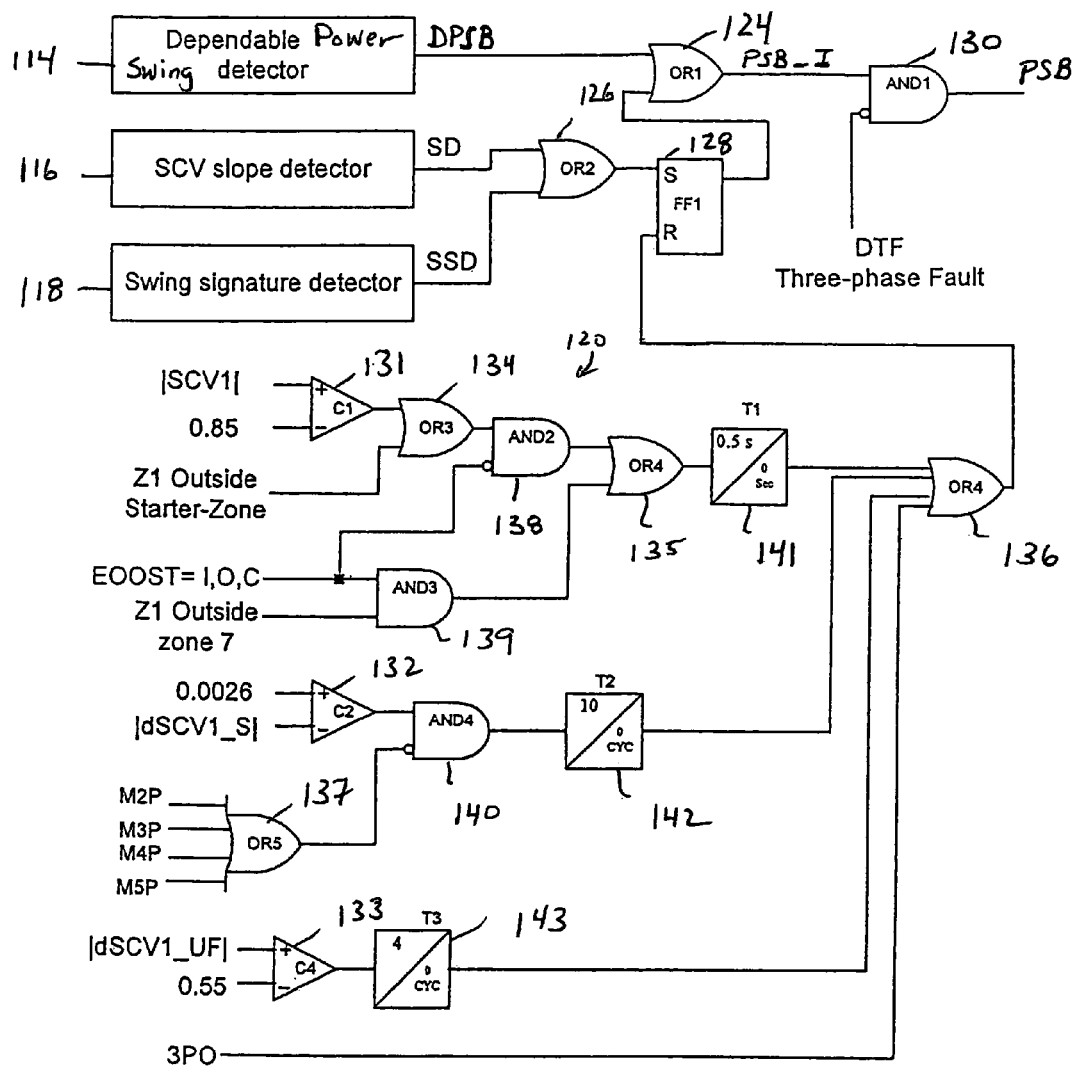
FIG. 10 is a mixed block and circuit diagram of the system illustrated in FIG. 9, showing a circuit diagram representation of the reset circuit illustrated in FIG. 9.
Figure 12:
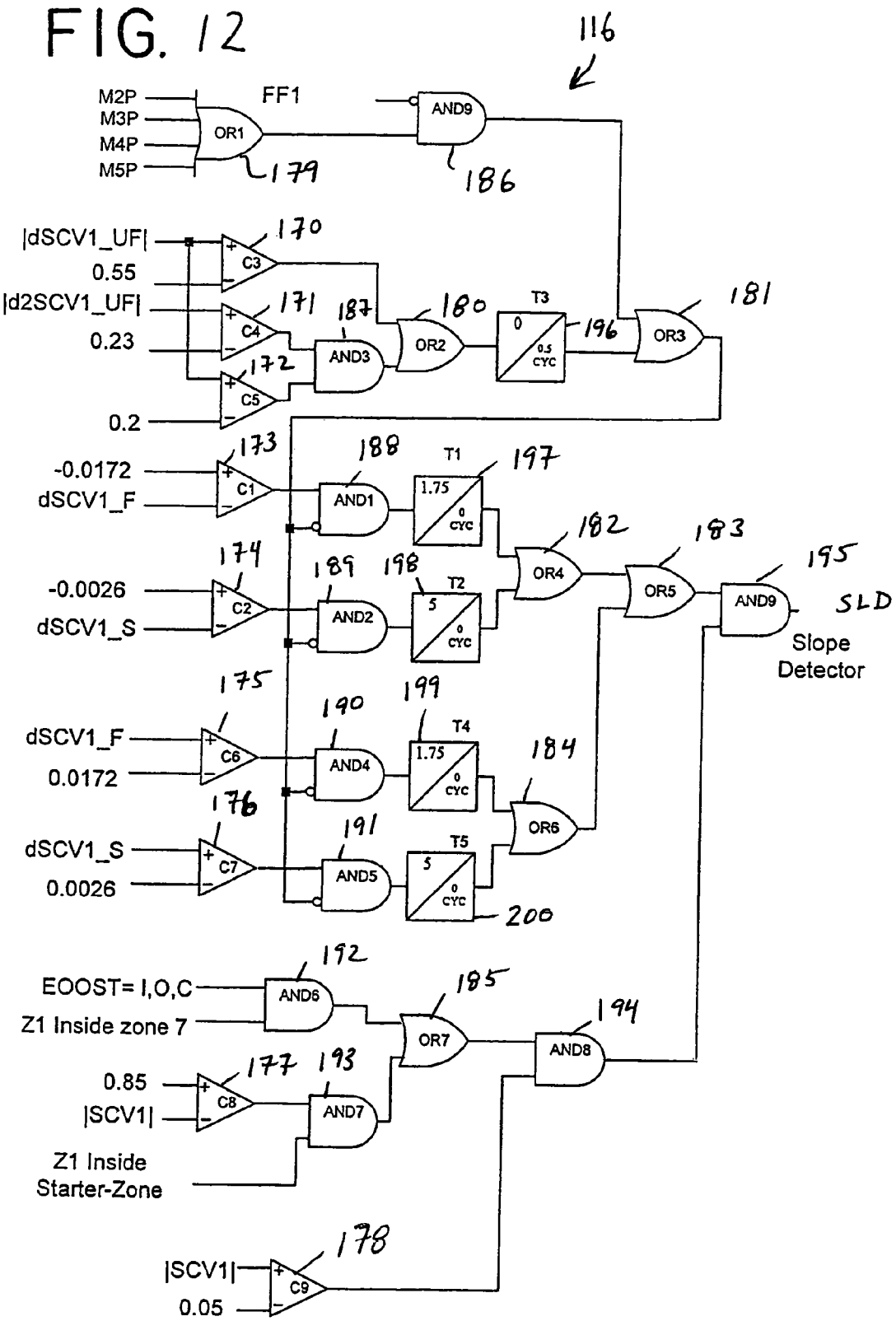
FIG. 12 is a circuit diagram representation of the swing-center voltage slope detector logic illustrated in FIG. 9.

FIG. 10 also illustrates the no-setting power swing detection technique illustrated in FIG. 9 but shows details of a preferred circuit that may be used to implement the reset logic 120. The logic shown in FIG. 10 is used to set and reset the power swing detection signal PSB, which is used to provide relay blocking. As will be appreciated, the power swing detection signal PSB is controlled by the output of SR flip-flop 128. As shown, swing-center voltage (SCV) slope detector 116 and swing signature detector 118 are used to set the flip-flop 128. Preferred circuit implementations of these two system elements are illustrated in FIGS. 12 and 14, respectively. A preferred circuit implementation of the dependable power swing detector 114 is illustrated in FIG. 15. As shown in FIG. 10, dependable power swing detector 114 supplements the swing-center voltage slope detector 116 and the swing signature detector 118.

Still referring to FIG. 10, the power swing detection signal PSB is set when the output signal SD of slope detector 116 goes HIGH. Slope detector 116 measures the time-derivative of the swing-center voltage and will detect most power swing conditions.

The power swing detection signal PSB will also be set when the output signal SSD of swing signature detector 118 goes HIGH. Swing signature detector 118 detects a power swing only if the power swing causes one of the outermost zone mho-phase elements, desired to be blocked, to pick-up. If there is a power swing with no pick-up by such a mho-phase element, SSD will not be asserted.

The power swing detection signal PSB will also be set when the output signal DPSB of the dependable power swing detector 114 goes HIGH. The dependable power swing detector 114 does not control flip-flop 128 and is used in those relatively infrequent occasions when slope detector 116 and swing signature detector 118 fail to detect a power swing. As further shown in FIG. 10, the power swing detection signal PSB is inhibited during the occurrence of a three-phase fault, permitting the relays to operate and clear any such faults.

The reset logic 120 is preferably implemented with a plurality of logic gates including comparators 131-133, OR gates 134-137, AND gates 138-140, and counters 141-143. The circuit elements are preferably coupled as shown in FIG. 10.

The power swing detection signal PSB will be reset as a result of the reset logic 120 causing flip-flop 128 to be reset. In the illustrated example, a reset signal will be sent to flip-flop 128 when the unstable power swing detection and responsive selective tripping or pole slipping function is not enabled, EOOST is set to O in FIG. 10, and when the positive sequence swing-center voltage SCV1 magnitude goes below 0.85 Volts per unit per cycle (V(pu)/cycle) or the positive sequence impedance Z1 goes outside the starter zone for a time interval greater than 0.5 seconds. A reset signal will also be sent to flip-flop 128 when the unstable power swing detection and responsive selective tripping or pole slipping function is enabled, EOOST is set to I in FIG. 10, and the positive sequence impedance Z1 stays outside a predetermined zone defined by the unstable power swing detection logic (referred to as zone 7 in FIG. 10) for an interval of time greater than 0.5 seconds. Still further, a reset signal will be sent to flip-flop 128 when the magnitude of the slow derivative of the positive-sequence swing center voltage |dSCV1_S| falls below 0.0026 V(pu)/cycle for more than ten cycles and a fault is not detected in the same time. It has been observed that, for the illustrated case, the threshold of 0.0026 V(pu)/cyc is the value of the minimum detectable swing center voltage rate of change. A reset signal will also be sent to flip-flop 128 when the ultra-fast derivative of the positive-sequence swing center voltage |dSCV1_UF| exceeds 0.55 V(pu)/cycle for more than four cycles. It has been observed that, for the illustrated case, the threshold of 0.55 V(pu)/cyc is the maximum boundary for the measurement of the swing center voltage rate of change.

Figure 11:
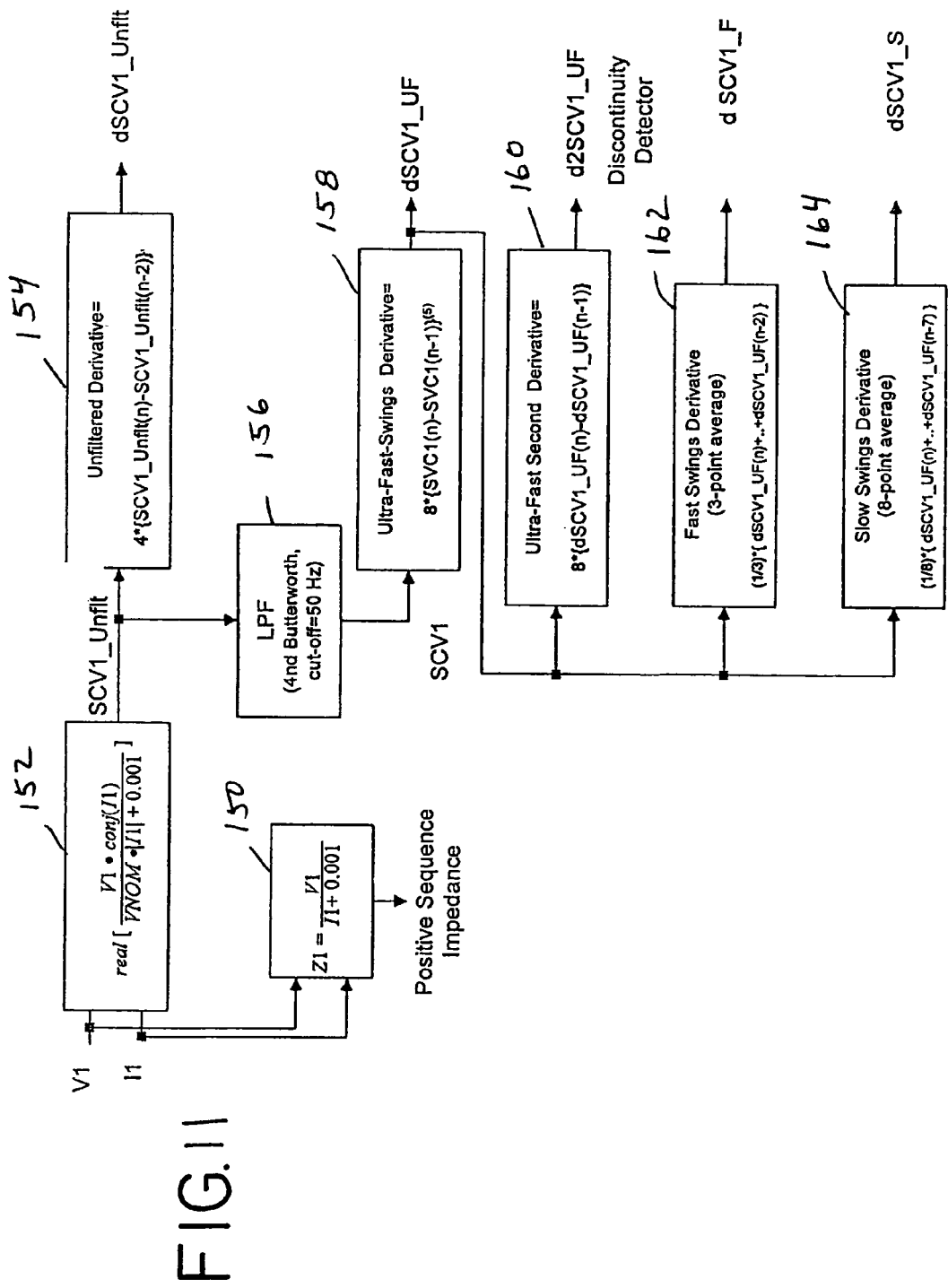
FIG. 11 is a diagram representing the measurement of the first and second time derivatives for the positive sequence swing-center voltage signal SCV1.

The preceding circumstances refer to instances where the power swing detection signal PSB will be reset by flip-flop 128 and the relay blocking function will be inhibited. The examples used refer to time derivatives for the positive sequence swing-center voltage signal SCV1. FIG. 11 illustrates the measurement of the first and second time derivatives for the positive sequence swing-center voltage signal SCV1, including slow, fast, ultra-fast and unfiltered derivatives, as shown. These derivatives are used in the preceding examples and in other examples set forth in this disclosure. In particular, the preferred circuits used to implement swing center voltage slope detector 116 and swing signature detector 118 require these measurements to operate.

Preferably, function processing is carried out every eighth of one cycle. As such, there are four types of first-order time derivatives and a single second-order time derivative applicable. Referring to FIG. 11, the positive sequence voltage V1 and positive sequence current I1 are received from a full-cycle cosine filter (not shown). When a pole-open condition exists, it is important that the corresponding voltage and current are set to zero when the computation of the positive sequence voltage and current are performed. Doing otherwise can lead to a very noisy positive sequence swing center voltage SCV1 and positive sequence impedance Z1. Noise becomes particularly noxious when the derivatives of SCV1 are measured.

The positive sequence impedance Z1 is calculated as shown in the formula within box 150. Similarly, the positive sequence swing-center voltage is established using the positive sequence voltage V1 and current I1 as shown in the formula within box 152. SCV1_Unflt represents the unfiltered normalized (per unit) positive sequence swing center voltage. The unfiltered first order derivative of the positive sequence swing center voltage (dSCV1_Unflt) is computed by taking the difference over two samples of the unfiltered swing center voltage (SCV1_Unflt), as represented by box 154. The positive sequence swing center voltage SCV1 is the product of passing the unfiltered per unit positive sequence swing center voltage SCV1_Unflt through a low-pass fourth-order Butterworth filter 156 with a cut-off frequency at fifty hertz. The ultra-fast first order time derivative of the positive sequence swing center voltage (dSCV1_UF) is computed by taking the difference between two successive samples of the positive sequence swing center voltage (SCV1), as represented by block 158. The ultra-fast second order time derivative of the positive sequence swing center voltage (d2SCV1_UF), also referred to as the discontinuity detector, is computed by taking the difference over one sample interval of the ultra-fast first order time derivative of the positive sequence swing center voltage (dSCV1_UF), as represented by block 160. The fast first-order time derivative of the positive sequence swing center voltage (dSCV1_F) is computed by taking a three-point average of the ultra-fast first-order time derivative of the positive sequence swing center voltage (dSCV1_UF), as represented by block 162. Finally, the slow first-order time derivative of the positive sequence swing center voltage (dSCV1_S) is computed by taking an eight-point average of the ultra-fast first order time derivative of the positive sequence swing center voltage (dSCV1_UF), as represented by block 164.

FIG. 12 illustrates a preferred circuit used to implement the swing-center voltage slope detector logic 116, which performs the primary functions related to power swing detection and responsive relay blocking. Swing center voltage slope detector 116 detects a power swing by monitoring the time rate of change of the swing center voltage signal. The minimum and maximum values for the useful rate-of-change interval that will be measured are defined establishing parameters for detection of power swing conditions. As derived above, assuming the output voltage E for a two-machine system with a transmission line between the two machines, the swing center voltage SCV and the angle difference δ between the two sources is given by:

$$SCV = E\cos\left(\frac{\delta}{2}\right)$$

Furthermore, the first order time derivative of the swing center voltage, given as a function of the rate of change of the angle between the two machines, is given by:

$$\frac{d(SCV)}{dt} = -\frac{E}{2}\sin\left(\frac{\delta}{2}\right)\frac{d\delta}{dt}$$

The rate of change of the angle between the two machines dδ/dt is also called the slip frequency. When setting the desired interval of the slip frequency for detection of a power swing, it is important to determine the corresponding safe interval for the rate of change of the swing center voltage (d(SCV)/dt). The interval chosen for this preferred example is a slip frequency between 0.1 and 7 hertz. For the purpose of computing the upper boundary, the maximum value of the derivative of the swing center voltage will occur when δ is close to one hundred eighty degrees. Expressing the rate of change of the swing center voltage in per unit value of the rated voltage per cycle and introducing a security factor of 1.5 yields:

$$\max\left(\frac{d(SCV)}{dt}\right) = -\frac{1.5}{2}\frac{2\pi}{60}\frac{7}{} = 0.55 \text{ V}(pu)/cyc$$

Computing the lower boundary corresponding to a slip frequency of 0.1 Hz and introducing a security factor of two yields:

$$\min\left(\frac{d(SCV)}{dt}\right) = -\frac{2\pi}{2}\frac{0.1}{2}\frac{1}{60} = 0.0026 \text{ V}(pu)/cyc$$

Referring to FIG. 12, the swing center voltage slope detector logic preferably includes, as shown, a plurality of logic gates including comparators 170-178, OR gates 179-185, AND gates 186-195, and counters 196-200. These circuit elements are preferably coupled in the manner shown in FIG. 12.

In operation, if the absolute value of the ultra-fast first-order time derivative of the positive sequence swing center voltage (|dSCV1_UF|) is greater than the maximum value established above (0.55 V(pu)/cyc), as determined by comparator 170, measurement of the variation of the swing center voltage is inhibited. Counter 196 functions as a dropout timer and extends the inhibition for a half cycle when the condition is removed.

The same inhibition is applicable when the ultra-fast second order time derivative of the positive sequence swing center voltage (|d2SCV1_UF|), also known as the discontinuity detector, is greater than 0.23, as determined by comparator 171, and |dSCV1_UF| is greater than 0.2, as determined by comparator 172. These two conditions ensure that no measurement is made of the time rate of change of the swing center voltage when the maximum rate-of-change is exceeded and/or when the discontinuity detector reflects that one or more select changes have occurred on the network (fault or other). If a fault is detected on the network (at least one of M2P to M5P go HIGH at OR gate 179), measurement of the rate of change of swing center voltage is also inhibited during the duration of the fault detection. This ensures that a power swing condition is not detected during a fault, which would block select relay operation. Consequently, the fault will be cleared.

Comparators 173 and 174 monitor a negative time-change of the positive sequence swing center voltage. The minimum rate of change threshold for this example established above (−0.0026 V(pu)/cyc) is compared with the slow first order derivative of the positive sequence swing center voltage (dSCV1_S), at comparator 174. If this slow derivative is below the minimum threshold for at least five cycles, as determined by counter 198, the condition is recognized. Similarly, time-rates below −0.0172 V(pu)/cyc are detected by the fast first order time derivative of the positive sequence swing center voltage (dSCV1_F) and must last 1.75 cycles before they are detected, as determined by comparator 173 and timer 197.

Comparators 175 and 176 monitor a positive time change of the positive sequence swing center voltage. For this example, the minimum detectable change is 0.0026 V(pu)/cyc, as established above. This minimum change is compared with the slow first order time derivative of the positive sequence swing center voltage (dSCV1_S) at comparator 176 and as before, the change has to be present for at least five cycles to be detected, as determined by counter 200. Similarly, changes above 0.0172 V(pu)/cyc are detected by the fast first order time derivative of the positive sequence swing center voltage (dSCV1_F), at comparator 175, and must last 1.75 cycles before they are detected, as determined by counter 199.

Upon detection of the occurrence of any significant rate of change of the swing center voltage, the output of OR gate 183 goes HIGH. As a result, the swing center voltage slope detector signal SLD will be asserted when the absolute value of the positive sequence swing center voltage is less than 0.85 pu, as determined by comparator 177, and the location of the positive sequence impedance (Z 1) is inside the starter zone, as determined by AND gate 193, and the absolute value of the positive sequence swing center voltage exceeds 0.05, as determined by comparator 178 and AND gate 194. Alternatively, when there is a significant rate of change of the swing center voltage causing the output of OR gate 183 to go HIGH, the swing center voltage slope detector signal SLD will assert if an unstable power swing is detected (i.e., EOOST=I, O, C) and if the positive sequence impedance (Z1) is inside a predetermined zone (referred to as zone 7).

Figure 13:
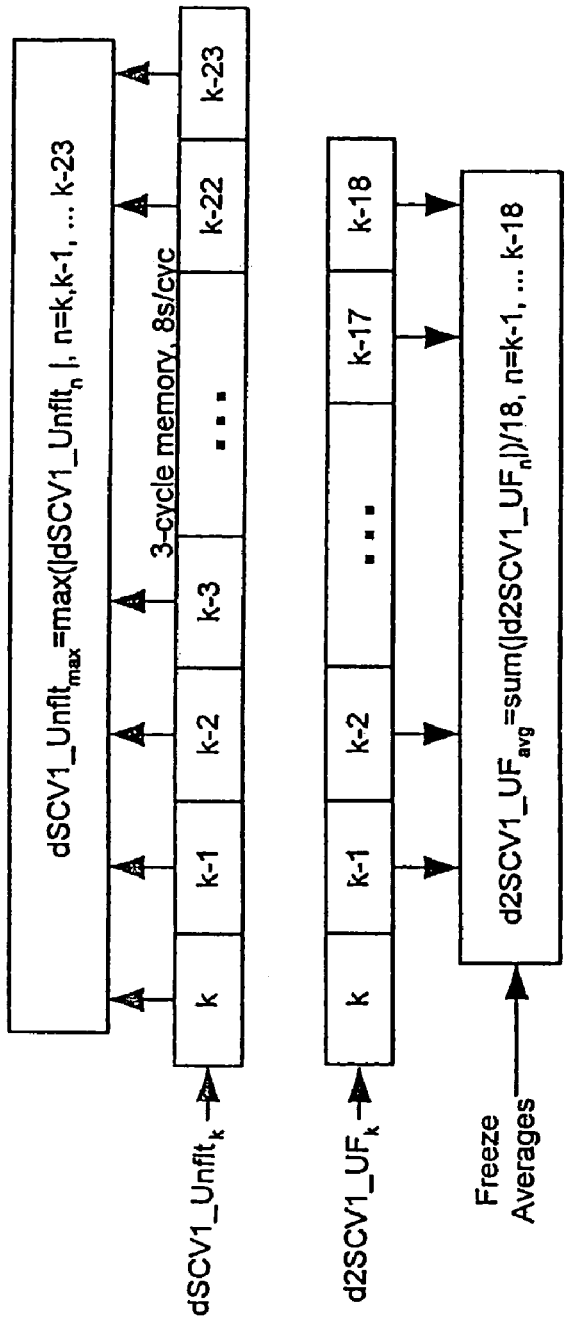
FIG. 13 is a diagram representing the calculation of values used in the circuit diagrams of FIGS. 14 and 15.

FIG. 13 illustrates the calculation of the maximum unfiltered first order time derivative of the positive swing center voltage used in the preferred circuit implementation of the swing signature detector logic illustrated in FIG. 14. FIG. 13 also illustrates the calculation of the average ultra-fast second order time derivative of the positive sequence swing center voltage used in the preferred circuit implementation of the dependable power swing detector logic illustrated in FIG. 15.

The upper portion of FIG. 13 illustrates a twenty-four sample memory buffer used to store the unfiltered first order time derivatives of the positive sequence swing center voltage over three cycles at a processing rate of eight samples per cycle. The input to the memory buffer comes from a differentiator-smoother output, specifically block 154 of FIG. 11. The maximum unfiltered first order time derivative of the positive sequence swing center voltage is determined from the absolute values of the past three-cycle derivatives saved. In this example, an index with a higher value represents a more recent swing center voltage derivative result. Index (k) represents the present swing center voltage derivative, while index (k−23) represents a swing center voltage derivative at the time instant of −23 samples.

The lower portion of FIG. 13 illustrates a nineteen sample memory buffer used to store the ultra-fast second order time derivative of the positive sequence swing center voltage (discontinuity detector) for the past 2.375 cycles, as output from block 160 of FIG. 11. A control bit, referred to as Freeze Averages in FIG. 11, is used with this calculation. When the control bit is not asserted, the average ultra-fast second order time derivative of the positive sequence swing center voltage is calculated as the average of absolute values of saved second derivatives from samples k−1 to k−18, skipping the present sample k. When the control bit is asserted, the average ultra-fast second order time derivative of the positive sequence swing center voltage takes the previous calculated value.

FIG. 14 illustrates a preferred circuit implementation of the swing signature detector logic 118. The swing signature detector logic 118 is designed to block or inhibit the operation of the distance elements prone to operate improperly during power swing conditions. The swing signature detector logic 118 uses the most overreaching distance element subject to power swing blocking as the detection boundary. Therefore, no additional power swing detection zones are required. At the time that the most overreaching distance element picks up, the swing signature detector logic 118 evaluates the unfiltered first order time derivatives of the positive sequence swing center voltage saved in the three cycle memory buffer as illustrated in FIG. 13 and finds the signature differentiating power swings from faults. If the swing signature detector logic 118 determines that the distance element pickup is due to a power swing, then the logic asserts its output signal SSD, which, in turn, causes the distance element output stage to block the distance element from operation. If there is a power swing condition on the system, but the swing does not cause any distance elements subject to power swing blocking to pick up, then the swing signature detector logic 118 is inactive.

Preferably, the swing signature detector logic 118 and, for that matter, the rest of the power swing detection logic, is processed after the distance element logic and before the final distance element output (trip) logic.

The preferred circuit implementation of the swing signature detector logic 118 includes a plurality of logic gates including comparators 210-219 (with comparators 212-216 not shown in FIG. 14), OR gates 220-223, AND gates 224-237, counters 238-239, and summation element/adder 240. These circuit elements are preferably coupled as shown in FIG. 14.

In operation, if the transmission line section protected is not in a single-pole-open condition (SPO is LOW), the AND gates 228-231 and OR gate 239 monitor the most overreaching phase distance element subject to power swing detection and responsive relay blocking. When the most overreaching phase distance element picks up, the AND gate 239 allows the element to output if the output of AND gate 235 is LOW. The output of AND gate 235 is conditioned upon system unbalanced protection logic picking up and its pickup duration being less than eight cycles without the single-pole-open (SPO) condition, as determined by AND gates 232, 235 and counter 239. The system unbalanced protection logic monitors the forward unbalanced condition on the system and is further explained with reference to FIG. 17. If that logic picks up at the time that the most overreaching phase distance element picks up, then the distance element indicates a fault condition because power swings are a balanced phenomenon without a single-pole-open condition. If the logic picks up for more than eight cycles without the single-pole-open condition on the line section under protection, then the condition indicates a possible single-pole-open condition of adjacent lines and will reset the system unbalanced protection logic on the phase distance element outputs through AND gate 239.

During a single-pole-open condition on the protected line, the AND gates 224-227 and OR gate 221 monitor the most overreaching ground distance element subject to power swing detection and responsive relay blocking. When the most overreaching ground distance element picks up, AND gate 233 allows the element to output if the output of OR gate 220 is asserted. OR gate 220 has inputs of PSBA, PSBB and PSBC elements that indicate a single-pole-open condition for each phase without any additional faults on the line. PSBA, PSBB and PSBC elements are further explained with reference to FIG. 18.

The most overreaching phase and ground distance elements subject to power swing detection and responsive relay blocking are inputs to OR gate 223, with its output connected to the input of the counter/timer 238. Counter 238 has an instantaneous pickup time and a half cycle dropout time, as shown. Its purpose is to de-bounce the distance elements that may drop out and then pick up again for a brief duration during a clearance of a fault.

At the rising edge of the output of counter 238, provided the output of AND gate 236 is asserted, the output of AND gate 237 asserts to indicate a power swing condition. When a system operates at equilibrium/steady state, the swing center voltage time derivative is relatively close to zero. If a fault occurs on the system, the swing center voltage time derivative will jump to a relatively high value. Considering the total filtering delay of a typical microprocessor relay, the maximum swing center voltage time derivative caused by a fault will appear in the first cycle of the three cycle memory buffer. Comparators 210-217 compare the absolute values of the unfiltered first order time derivatives of the positive sequence swing center voltage from the oldest one cycle of the buffer with the maximum unfiltered first order time derivative of the positive sequence voltage, as derived from FIG. 13. The output of comparator 219 is asserted if the number of these derivatives that are greater than five percent of the maximum value is greater than or equal to two, as shown. The purpose of comparator 218 is to ensure that the maximum unfiltered first order time derivative of the positive sequence swing center voltage is a valid value instead of noise. The output of AND gate 236 goes HIGH upon the occurrence of a disturbance on the system prior to distance element pickup.

FIG. 15 illustrates the preferred circuit implementation for the dependable power swing detector 114. For a system with a small stability margin, the system may start to swing during an external multi-phase fault. Depending on the system stability reserve margin, the fault clearance time and the fault type, the angle difference between two equivalent machines may already swing to a large value at the time of the fault clearance. Therefore, by the time the fault is cleared, the impedance measured by a distance relay may already reside in a protection zone subject to power swing blocking and the power swing detection logic will fail to operate to block the distance element operation.

Due to the manner in which it operates, the swing signature detector logic 118 will correctly pick up and block the distance element in such situation if the initial fault is in the reverse direction. However, the swing center voltage slope detector 116 and the swing signature detector 118 will fail to block the distance element if the initial fault is in a forward distance zone subject to power swing detection and responsive relay blocking and the system starts to swing inside this distance zone after the fault is cleared.

The dependable power swing detector logic 114 is designed to deal with these difficulties. As shown in FIG. 15, the preferred circuit implementation of dependable power swing detector logic 114 includes a plurality of logic gates, including comparators 250-251, OR gates 252-256, AND gates 257-268, and counters 269-276. The circuit elements are preferably coupled as shown in FIG. 15.

The dependable power swing detector logic 114 is responsive to the detection of an external multi-phase fault. If the detected external multi-phase fault is on the system for two and one-half cycles without the power swing detection and responsive relay blocking operation and the local trip, then the dependable power swing detection logic will be initiated. If the zone-2 phase distance element picks up within one and one-half cycles of a reverse fault clearance, or if the zone-1 phase element picks up or the second time derivative of the swing center voltage has a sudden change after the dependable power swing detector logic is initiated, then a power swing condition is declared.

Following the declaration of a power swing condition by the dependable power swing detector logic 114, if the zone-2 distance element stays in a pickup state for more than one second, or the rate change of the positive-sequence impedance Z1 is less than a predetermined minimum threshold for one and one half power cycles, then the power swing detection signal resets. These reset conditions are safety measurements in case an internal multi-phase fault does occur following the clearance of the external multi-phase fault. The rate of change of the impedance is a good indication if the disturbance evolves into an internal multi-phase fault. However, as a last line of defense, if the time that the zone-2 element picks up is determined to exceed a predetermined relatively very long period of time (one second in this example), the logic resets the power swing detection signal even if the positive sequence impedance rate change condition is not satisfied.

The dependable power swing detection logic 114 considers external multi-phase faults only because the transient stability margin of a power system is sized under severe transient disturbances, such as three-phase or multi-phase faults.

Referring to FIG. 15, in operation, DIR3 is a relay setting that sets the direction of zone-3 distance elements. If DIR3=F, then the zone-3 distance elements detect faults that are in the forward direction. If DIR3=R, then the zone-3 distance elements detect faults that are in the reverse direction. M3P is a zone-3 phase distance element. The state of M3P is HIGH if any multi-phase faults are detected inside the zone-3 protection region. DIR4 and M4P are the direction setting and phase distance element for zone-4 protection. DIR5 and M5P are the direction setting and phase distance element for zone-5 protection. M2P is the zone-2 phase distance element that is fixed to the forward direction. MAB12, MBC12 and MCA12 are zone-1 phase distance elements with a fixed security pickup count.

FF1 is the output of the circuit illustrated in FIG. 10. When a power swing condition has been detected by the no-setting power swing detection circuit illustrated in FIG. 10, FF1 is in a HIGH state. TRIP is the output of the relay trip logic. When TRIP is in a HIGH state, this is an indication that the relay has closed its contact output and energized a circuit breaker trip coil. MAB2_I, MBC2_I and MCA2_I are zone-2 phase elements taken before the security counters in the phase zone-2 mho logic.

A two-input AND gate 257 outputs the zone-3 phase distance element, M3P, to a three-input OR gate 252, if the zone-3 direction is set to reverse. Similarly, AND gates 258, 259 output zone-4 and zone-5 phase distance elements, M4P and M5P respectively, to OR gate 252, if their directions are set to reverse-looking. The output of OR gate 252 therefore represents any multi-phase faults behind the relay that are inside zone-3, zone-4 or zone-5 protection regions when they are set as reverse-looking protection elements.

The output of OR gate 252 is coupled to a three-input AND gate 263, which also receives inputs from existing relay elements, TRIP and FF1. The output of AND gate 263 indicates a condition that there is a reverse multi-phase fault without the power swing condition detected and the relay is not issuing a trip output. The output of AND gate 263 is then fed to a counter or delay pickup timer 269, which has a 2.5-cycle delay pickup time and an instantaneous dropout time. The falling edge of the output of delay pickup timer 269 feeds to a counter or timer 270, which has an instantaneous pickup timer and a one and one-half cycle delay dropout time, as shown. The output of timer 270 serves as one of the inputs for a two-input AND gate 264. The other input of AND gate 264 is fed by the output of counter or timer 273. The input to timer 273 is the output of OR gate 256, which is a function of MAB2_I, MBC2_I and MCA2_I, identified above. The output of timer 273 is therefore any internal zone-2 phase element pickups that are de-bounced by a 0.25-cycle delay dropout time, as shown.

The two-input AND gates 260-262 route zone-3, zone-4 or zone-5 phase distance elements to a four-input OR gate 253, if their directions are set as forward. Zone-2 phase distance element M2P is the fourth input of OR gate 253. The directionality of zone-2 phase element is fixed as forward-looking only. The output of OR gate 253 therefore represents any multi-phase faults in the front of the relay that are inside zone-2, zone-3, zone-4 or zone-5 protection regions when zone-3, zone-4 or zone-5 are set as forward-looking protection elements.

The output of OR gate 253 is an input to the three-input AND gate 265. The other two inputs of AND gate 265 come from existing relay elements, TRIP and PSB. The output of AND gate 265 indicates a condition that there is a forward multi-phase fault without the power swing condition detected and the relay is not issuing a trip output. The output of AND gate 265 is then fed to a counter or delay pickup timer 271, which has a two and one-half cycle delay pickup time and an instantaneous dropout time.

The output of delay pickup timer 271 is fed to one of the inputs of a two-input AND gate 266. The other input of AND gate 266 is fed by the output of the four-input OR gate 254. Three of the four inputs of OR gate 254 are three zone-1 phase distance elements, MAB12, MBC12 and MCA12. These zone-1 phase elements differ from the normal zone-1 phase distance elements, MAB1, MBC1 and MCA1 in that MA12, MBC12 and MCA12 are faster than MAB1, MBC1, and MCA1, respectively. The other input of OR gate 254 is fed by the output of counter or timer 272, which has a two-processing-count delay pickup time and an instantaneous dropout time. The input of timer 272 is fed by the output of comparator 250, which is in a HIGH state when the ultra-fast second order time derivative of the positive sequence swing center voltage exceeds two times its average (as calculated in FIG. 13), plus 0.06. The output of AND gate 266 represents a condition that either a zone-1 multi-phase fault has been detected, or the second order time derivative of the swing center voltage has a sudden change after a forward overreach zone detects a multi-phase fault for two and one-half power cycles.

The rising edge of the output of AND gate 266 feeds one input of three-input OR gate 255. When the output of AND 266 transitions HIGH, the input of OR gate 255 goes HIGH for one processing cycle. Otherwise, that input is LOW. Another input of OR gate 255 is fed by the output of AND gate 264, causing the output of OR gate 255 to go HIGH for one processing cycle upon the output of AND gate 264 transitioning HIGH.

The output of OR gate 255 feeds counter or qualifying timer 276. Timer 276 has a 0.125-cycle delay pickup time and an instantaneous dropout time. The delay pickup time of timer 273 must be less than the time difference between MAB12, MBC12 and MCA12 element pickup time and MAB1, MBC1 and MCA1 element pickup time when their adaptive pickup time is at the upper value.

Comparator 251, AND gates 267-268, and two counters/timers 274-275 form a seal-in and unlatch logic for the output of OR gate 255. Once the output of OR gate 255 is initially asserted by either a rising edge of the output of AND gate 264 or a rising edge of the output of AND gate 266, the output of OR gate 255 is sealed in as long as the output of AND gate 268 is in a HIGH state.

The positive input of comparator 251 is fixed as the Z1MAG setting, which corresponds to the secondary ohm value of the transmission line under protection. $|Z1_k-Z1_{k-1}|*8*fnom$ is the absolute value of the rate change of the positive-sequence impedance, Z1, scaled to ohms per second. With the assumptions of a maximum power swing detection period of two seconds and the total system impedance equaling one and one-half times the line impedance, the minimum value of this quantity is $(3\pi/8)$ times Z1MAG, which occurs when the phase difference $(\delta)$ is equal to one hundred eighty degrees. For convenience, a value of 1.0 may be used to approximate $(3\pi/8)$. The output of comparator 251 indicates a condition that the time rate change of the positive-sequence impedance is smaller than the minimum value of the rate of change that results from a legitimate power swing condition.

The output of comparator 251 feeds a two-input AND gate 267. The other input of AND gate 267 is fed by the output of OR gate 255. Timer 274 has a one and one-half cycle delay pickup time and an instantaneous dropout time, as shown. Timer 274 qualifies the output of AND gate 267 accordingly. This output is asserted when the output of OR gate 255 is HIGH and the impedance rate of change has fallen below a minimum value for at least 1.5 cycles.

The output of timer 267 feeds an active LOW input of a four-input AND gate 268. AND gate 268 has another active LOW input fed by the output of timer 275. The input of timer 275 is fed by the output of AND gate 268, creating a feedback-type relationship, as shown. Timer 275 has a delay pickup time of one second and an instantaneous dropout time, as shown. AND gate has two more inputs, one is fed by the output of timer 273 and the other is fed by the output of OR gate 255.

When the output of OR gate 255 is asserted and the internal zone-2 elements stay picking up, the output of AND gate 268 will be asserted, provided that the outputs from timers 274-275 remain LOW. The output of AND gate 268 feeds OR gate 255 and latches its output. The output of AND 268 can be reset when its output asserts for more than one second or when the impedance rate of change is below a predetermined minimum threshold for more than one and one-half power cycles.

The dependable power swing detection signal DPSB is the final output of the dependable power swing detector 114. This signal DPSB complements the remainder of the no-setting power swing detection and responsive relay blocking scheme to increase the dependability of stable power swing detection after an external multi-phase fault is cleared.

FIG. 16 illustrates a preferred circuit implementation of three-phase fault detector 122, which is included in order to detect the occurrence of three-phase faults during power swing conditions and inhibit the relay blocking function until such time as the detected three-phase fault is cleared. Three-phase fault detector 122 preferably includes a plurality of logic gates, including comparators 280-293, AND gates 284-287, counters or timers 288-291, and OR gate 292 arranged and coupled as shown in FIG. 16.

The magnitude of the discontinuity detector (|d2SCV1_UF|) will exceed 0.23 when a change has taken place on the network that could be a fault. The output of timer 228 will agree when this condition exists. Timer 228 has a dropout time of six cycles.

The output of timer 289 will assert only when the following conditions occur for more than two power cycles: the magnitude of the slow first order time derivative of the positive sequence swing voltage (|dSCV1_S|) must fall below 0.01; the magnitude of the positive sequence swing center voltage (SCV1) must fall below 0.1; the flip-flop 128 illustrated in FIG. 10 must be asserted; and the positive sequence impedance (Z1) location must be within a predetermined inner zone.

A three-phase fault is detected if timer 288 and timer 289 are asserted. In response, three-phase fault detection signal DTF will be asserted.

If timer 288 is not asserted and the conditions referenced above causing timer 289 to be asserted last for more than five cycles, the output of timer 290 is asserted, as shown. In response, a three-phase fault is detected and the three-phase fault detection signal DTF is asserted.

If flip-flop 128 (see FIG. 10) is asserted, the positive sequence impedance (Z1) is within the predetermined inner zone, the magnitude of the positive sequence swing center voltage is less than 0.1 and all three conditions exist for more than ten cycles, a three phase fault is detected, as determined by AND gate 285, comparator 283 and timer 291. Consequently, three-phase fault detection signal DTF is asserted through OR gate 292.

Referring back to FIG. 10, when the three-phase fault detection signal DTF is asserted upon the detection of a three-phase fault, the power swing detection signal PSB is inhibited to permit the three-phase fault to be cleared.

During a three-phase fault, the positive sequence swing-center voltage SCV1 is expected to take a low value. It has been observed that for lines with a lower angle, the positive sequence swing center voltage could exceed 0.1 during a three-phase fault. For this reason, the maximum value of 0.1 or the cosine of the line angle serves as the threshold value for comparators 281, 283 in FIG. 16.

FIG. 17 illustrates system unbalanced protection logic 300 designed to detect an unbalanced system condition in the relay forward direction. This logic 300 is preferably incorporated within the swing signature detector logic 118 and is preferably also incorporated in the phase mho logic to reset the power swing detection condition. As illustrated, logic 300 preferably includes comparators 301, 302, counters or timers 303, 304 and AND gate 305.

The system unbalanced condition represented by the negative-sequence current I2 is qualified by requiring its magnitude be greater than a2 (defined herein) times the magnitude of the positive-sequence current I1. Setting a2 is an existing relay setting that is normally set to above normal unbalance of the system coming from different line conductor arrangements and/or untranposed lines. The negative-sequence quantity always has a transient output when there is a line-switching event. The total system filtering and the negative-sequence filtering determine the duration of the transient. With filters used in typical distance relays, the transient duration is less than one and one-half cycles. The timer 303 is therefore set to qualify the unbalanced condition by requiring the output of comparator 301 to last for more than one and one-half cycles.

Comparator 302 qualifies the quantity of the positive-sequence current by requiring it be greater than 0.1 times the nominal current setting In. During a power swing condition, the phase current magnitude oscillates. To prevent the system unbalanced protection logic from dropping out during a current minimum, timer 304 is set with a half-cycle delay dropout time to support the qualification of the I1 during a power swing condition.

As shown in FIG. 17, system unbalanced protection logic 300 asserts if the outputs of timers 303 and 304 and the negative-sequence forward directional element, represented as 32Q, assert.

FIG. 18 illustrates a representative circuit 320 used to enable blocking of the ground distance elements during a single pole open condition. The outputs of circuit 320, namely signals PSBA, PSBB and PSBC indicate a single-pole-open condition for each phase without any additional faults on the line. PSBA, PSBB and PSBC are fed to OR gate 220 of the swing signature detector logic illustrated in FIG. 14. During a single-pole-open condition for a phase without any additional faults on the line, the system may lose its synchronism. Therefore, it is desired to block the ground distance elements during these circumstances using the power swing detection logic output. Should an additional emerging fault occur on the system, it is important to inhibit the power swing blocking function. This single-pole-open power swing blocking logic represented by circuit 320 is designed to fulfill this purpose. Circuit 320 includes AND gates 322-329 and OR gates 330-334. The logic uses the angle difference between the zero-sequence current and the negative-sequence current. This angle difference stays in certain sections on the angle plane for different poles opened. In particular, the angle difference is between positive and negative sixty degrees when A-phase is open, the angle difference is between sixty degrees and one hundred eighty degrees when B-phase is open, and the angle difference is between negative sixty degrees and negative one hundred eighty degrees when C-phase is open. If the measured angle difference does not match the pole that is opened, then the mismatch indicates an additional fault during the single-pole-open condition. Should a phase-phase-ground fault occur on the remaining two phases during a single-pole-open condition, the angle difference between the zero-sequence current (I0) and negative-sequence current (I2) will not deviate from the angle sector that matches the pole opened. In this situation, the same three-phase fault detector is used to inhibit the power swing blocking function from blocking operation of the distance elements.

During a single-pole-open condition, if there is a sufficient amount of load current, the induced zero-sequence current and negative-sequence current will cause elements 50GF, 50GR, 50QF and 50QR to be picked up. Based on the logic between OR gates 330, 331 and AND gate 323, if 50GF or 50GR and 50QF or 50QR pick up, the AND gate 323 will assert its output, which in turn, will assert the output of AND gate 322 under this condition. A HIGH output from AND gate 322 will enable the calculation of the angle difference between the zero-sequence current and negative-sequence current to be made, as illustrated in FIG. 18. This HIGH output from AND gate 322 will also open the select one of AND gates 324-326 to output the angle sector decision.

If the calculated angle difference is within the range reserved for A-phase (±60°) and the pole opened is A-phase (i.e., SPOA is asserted), then the output of AND gate 327 will assert. If the calculated angle difference is within the range reserved for B-phase (between 60° and 180°) and the pole opened is B-phase (i.e., SPOB is asserted), then the output of AND gate 328 will assert. If the calculated angle difference is within the range reserved for C-phase (between −60° and −180°) and the pole opened is C-phase (i.e., SPOC is asserted), then the output of AND gate 329 will assert.

Based on OR gates 332-334, PSBB and PSBC will assert when the output of AND gate 327, which indicates that there is no additional fault on the system during the A-phase open period, and therefore the B-phase and C-phase ground distance elements can be blocked using the power swing blocking function. Similarly, PSBC and PSBA will assert when the output of AND gate 328 asserts to allow C-phase and A-phase ground distance elements to be blocked using the power swing blocking function. Also, PSBA and PSBB will assert when the output of AND gate 329 asserts to allow A-phase and B-phase ground distance elements to be blocked using the power swing blocking function.

FIG. 19 illustrates a representation for defining the starter zone, namely that zone where the positive sequence impedance (Z1) must lie prior to the declaration of a power swing condition. It will be appreciated that with the subject invention, the area covered by the starter zone is not critical. It is only necessary to define the starter zone such that all mho detectors that are to be blocked during a power swing condition have their characteristic within the starter zone. Accordingly, the starter zone area may simply be defined as the rectangle illustrated by FIG. 19. In addition, if it is desired to enable the unstable power swing tripping function (i.e., EOOST is not set to N), then the starter zone preferably includes the outermost zone-7 of the unstable power swing tripping function with a margin of twenty percent. Upon occurrence of a power swing, if for the line of interest, the positive sequence impedance does not cross the starter zone, the power swing detection and responsive relay blocking signal (PSB) will not assert and thus the power swing will not be detected.

FIG. 20 illustrates a preferred inner zone corresponding to the zone within five percent around the transmission line extended positive sequence impedance characteristic in the complex plane. A three-phase fault is detected (see FIG. 16) only if the positive sequence impedance (Z1) lies within the inner zone. The purpose of the inner zone is therefore to add to the reliability of the three-phase fault detector.

FIG. 21 illustrates the resistive and reactive blinders that are used for the unstable power swing detection and responsive selective tripping or pole slipping function. The logic used to carry out this function takes advantage of already available calculations for the left, right, top, and bottom blinders of the sixth and seventh zones. The settings to be used are R1R6, R1R7, X1T6, and X1T7. Settings X1B6 and X1B7 can be specified by a user under the advanced settings option. The above settings are not difficult to calculate and do not require any stability studies as long as it is desired to perform an out-of-step trip on-the-way-out (TOWO). The out-of-step tripping on-the-way-in (TOWI) option requires a fast and robust detection of an unstable power swing, and a very accurate relative phase angle difference between equivalent sources to allow tripping before unsafe and dangerous conditions are reached. Therefore, the settings for this option are generally more difficult to calculate. Nonetheless, the application of this TOWI option is infrequent (may be not even applied at all). If a user desires to apply the TOWI option, stability studies to determine the proper settings for right and left hand blinders RR6 and RR7 must be performed.

FIG. 22 illustrates a representative logic circuit 350 used to derive logic bits X6, X7, R6, R7, RR6, RR7, RL6, and RL7, which are defined as zones in the illustration of FIG. 21. As shown, FIG. 22 includes comparators 351-359, OR gate 360, and AND gates 361-372. Several calculations related to the zone-6 and zone-7 right, left, top, and bottom blinders serve as inputs for comparators 352-359 in FIG. 22. The formulas for each of these calculations are set forth below:

Zone 6:

$$\text{Left Hand Blinder: } R1L6\_C = \frac{R1L6}{\sin(Z1ANG)} + \frac{\text{Im}(Z1)}{\tan(Z1ANG)}$$

$$\text{Right Hand Blinder: } R1R6\_C = \frac{R1R6}{\sin(Z1ANG)} + \frac{\text{Im}(Z1)}{\tan(Z1ANG)}$$

$$\text{Top Blinder: } X1T6\_C = \frac{X1T6}{\sin(Z1ANG)} - \frac{\text{Re}(Z1)}{\tan(Z1ANG)}$$

$$\text{Bottom Blinder: } X1B6\_C = \frac{X1B6}{\sin(Z1ANG)} - \frac{\text{Re}(Z1)}{\tan(Z1ANG)}$$

Zone 7:

$$\text{Left Hand Blinder: } R1L7\_C = \frac{R1L7}{\sin(Z1ANG)} + \frac{\text{Im}(Z1)}{\tan(Z1ANG)}$$

$$\text{Right Hand Blinder: } R1R7\_C = \frac{R1R7}{\sin(Z1ANG)} + \frac{\text{Im}(Z1)}{\tan(Z1ANG)}$$

$$\text{Top Blinder: } X1T7\_C = \frac{X1T7}{\sin(Z1ANG)} - \frac{\text{Re}(Z1)}{\tan(Z1ANG)}$$

$$\text{Bottom Blinder: } X1B7\_C = \frac{X1B7}{\sin(Z1ANG)} - \frac{\text{Re}(Z1)}{\tan(Z1ANG)}$$

Still referring to FIG. 22, each of the top inputs for AND gates 365-372 is an inverted output of OR gate 360. If a three-pole open condition exists (i.e., 3PO is HIGH) or a loss of potential is detected by the relay (i.e., ILOP is HIGH), the output of OR gate 360 is asserted and the logic bits X6, X7, R6, R7, RR6, RR7, RL6, and RL7 are inhibited from asserting.

Each middle input for AND gates 365-372 is fed by the output of comparator 351. Output C1 must be asserted (logic HIGH) to allow any of the logic bits X6, X7, R6, R7, RR6, RR7, RL6, and RL7 to assert, depending upon the status of the respective bottom input of AND gates 365-372.

X6 is the zone defined between the top blinder XT6 and bottom blinder XB6 illustrated by FIG. 21. The X6 bit is the output of three input AND gate 369. For X6 to assert, the output of comparator 351 must be asserted, the output of OR gate 360 must not be asserted, and the output of AND gate 363 must be asserted. The outputs of comparators 356 and 357 must be asserted in order for the output of AND gate 363 to assert. The output of comparator 356 is asserted if the calculated value of X1T6_C is greater than the imaginary part of the calculated positive-sequence impedance (Z1). The output of comparator 357 is asserted if the calculated value of X1B6_C is less than the imaginary part of the calculated positive-sequence impedance (Z1).

X7 is the zone defined between the top blinder XT7 and bottom blinder XB7 illustrated by FIG. 21. The X7 bit is the output of a three input AND gate 365. For X7 to assert, the output of comparator 351 must be asserted, the output of OR gate 360 must not be asserted, and the output of AND gate 361 must be asserted. The outputs of comparators 352 and 353 must be asserted in order for the output of AND gate 361 to assert. The output of comparator 352 is asserted if the calculated value of X1T7_C is greater than the imaginary part of the calculated positive-sequence impedance (Z1). The output of comparator 353 is asserted if the calculated value of X1B7_C is less than the imaginary part of the calculated positive-sequence impedance (Z1).

R6 is the zone defined between the right blinder RR6 and left blinder RL6 illustrated by FIG. 21. The R6 bit is the output of a three input AND gate 371. For R6 to assert, the output of comparator 351 must be asserted, the output of OR gate 360 must not be asserted, and the output of AND gate 364 must be asserted. The outputs of comparators 358 and 359 must be asserted in order for the output of AND gate 364 to assert. The output of comparator 358 is asserted if the calculated value of R1R6_C is greater than the real part of the calculated positive-sequence impedance (Z1). The output of comparator 359 is asserted if the calculated value of R1L6_C is less than the real part of the calculated positive-sequence impedance (Z1).

R7 is the zone defined between the right blinder RR7 and left blinder RL7 illustrated by FIG. 21. The R7 bit is the output of a three input AND gate 367. For R7 to assert, the output of comparator 351 must be asserted, the output of OR gate 360 must not be asserted, and the output of AND gate 362 must be asserted. The outputs of comparators 354 and 355 must be asserted in order for the output of AND gate 362 to assert. The output of comparator 354 is asserted if the calculated value of R1R7_C is greater than the real part of the calculated positive-sequence impedance (Z1). The output of comparator 355 is asserted if the calculated value of R1L7_C is less than the real part of the calculated positive-sequence impedance (Z1).

RR6 is the zone defined to the left of blinder RR6 illustrated by FIG. 21. The RR6 bit is the output of a three input AND gate 370. For RR6 to assert, the output of comparator 351 must be asserted, the output of OR gate 360 must not be asserted, and the output of comparator 358 must be asserted. The output of comparator 358 is asserted if the calculated value of R1R6_C is greater than the real part of the calculated positive-sequence impedance (Z1).

RR7 is the zone defined to the left of blinder RR7 illustrated by FIG. 21. The RR7 bit is the output of a three input AND gate 366. For bit RR7 to assert, the output of comparator 351 must be asserted, the output of OR gate 360 must not be asserted, and the output of comparator 354 must be asserted. The output of comparator 354 is asserted if the calculated value of R1R7_C is greater than the real part of the calculated positive-sequence impedance (Z1).

RL6 is the zone defined to the right of blinder RR6 illustrated by FIG. 21. The RL6 bit is the output of a three input AND gate 372. For RL6 to assert, the output of comparator 351 must be asserted, the output of OR gate 360 must not be asserted, and the output of comparator 359 must be asserted. The output of comparator 359 is asserted if the calculated value of R1L6_C is less than the real part of the calculated positive-sequence impedance (Z1).

RL7 is the zone defined to the right of blinder RR6 illustrated by FIG. 21. The RL7 bit is the output of a three input AND gate 368. For RL7 to assert, the output of comparator 351 must be asserted, the output of OR gate 360 must not be asserted, and the output of comparator 355 must be asserted. The output of comparator 355 is asserted if the calculated value of R1L7_C is less than the real part of the calculated positive-sequence impedance (Z1).

FIG. 23 illustrates the logic diagram of a circuit 400 designed to carry out the unstable power swing detection and selective relay tripping function. As shown, circuit 400 includes AND gates 401-413, OR gates 421-425, flip flops 431-436, and counter 440.

For the unstable power swing detection logic to function, the output of AND gate 401 must be asserted. Two conditions must be satisfied for the output of AND gate 401 to assert. First, the PSB_I bit, shown in FIG. 10, must be asserted. Second, the EOOST bit must be enabled and not set to N. The possible EOOST settings are N, I, O, and C. When EOOST is I, trip-on-the-way-in (TOWI) is permitted. When EOOST is O or C trip-on-the-way-out (TOWO) is permitted during the first slip cycle as long as the positive sequence impedance trajectory lies within zone X6. When EOOST is C trip-on-the-way-out (TOWO) is permitted after a set number of slip cycles as long as the positive sequence impedance trajectory lies within zone X7 and outside zone X6.

The unstable power detection logic monitors the movement of the calculated positive-sequence impedance (Z11) trajectory during a power swing and tracks it as it moves from the right to the left hand plane of the X-axis in the R-X diagram, or as it moves from the left to the right hand plane of the X-axis of the R-X diagram. In FIG. 23, the logic comprised of AND gates 401, 404, 405 and 406, OR gate 421 and flip-flops 432 and 433 is responsible for tracking the calculated positive-sequence impedance as it moves from the right to the left hand plane of the X-axis in the R-X diagram. The logic comprised of AND gates 401, 407, 408 and 409, OR gate 421 and flip-flops 434 and 435 is responsible for tracking the calculated positive-sequence impedance as it moves from the left to the right hand plane of the X-axis in the R-X diagram.

AND gates 410 and 411 allow trip-on-the-way-out (TOWO) as long as the calculated positive-sequence impedance lies in zone X6. AND gates 410, 412 and 413, flip-flop 436, and pole-slip counter 440 allow trip-on-the-way-out (TOWO) after a set number of slip cycles as long as the positive-sequence impedance lies in zone X7 and outside zone X6.

The logic comprised of AND gates 402 and 403 and flip-flop 431 allow trip-on-the-way-in (TOWI) as long as the calculated positive-sequence impedance lies between zones R6 and X6 and EOOST is set to I.

To facilitate an understanding of how this logic works and how it tracks the calculated positive-sequence impedance during a power swing, reference is made to FIG. 21 and an example is provided wherein the areas are defined as follows. Area 1 is defined as that area to the right of blinder RR7; area 2 is defined as that area between blinders RR6 and RR7; area 3 is defined as that area between blinders RL6 and RR6; area 4 is defined as that area between blinders RL6 and RL7; area 5 is defined as that area to the left of blinder RL7; area 6 is defined as that area between blinders XT6 and XT7; area 7 is defined as that area between blinders XB6 and XB7; and, area 8 is defined as that area between blinders XT6 and XB6.

The unstable power swing detection circuit 400 asserts its output (OST bit) provided that a power swing has been detected (i.e., PSB_I is asserted), the setting EOOST is not set to N (i.e., EOOST is enabled), and the positive-sequence impedance trajectory travels from the right to the left hand plane of the X-axis in the R-X diagram. Under these circumstances, the output of AND gate 401 is asserted because PSB_I is asserted (HIGH) and EOOST is not set to N. If the positive-sequence impedance trajectory is in areas 1 or 2, then the RL6 bit is asserted and the RR6 bit is not asserted (see FIG. 22), which causes the output of AND gate 404 to be asserted and sets the output of flip-flop 432. If the positive-sequence impedance trajectory moves in zone R6, i.e. between blinders RL6 and RR6 (in area 3), then the output of AND gate 405 is asserted and sets the output of flip-flop 433.

If the positive-sequence impedance trajectory moves to area 4 (between blinders RL6 and RL7) and then into area 5, as soon as RL6 drops-out, the output of AND gate 406 is asserted and through OR gate 421, the upper input of AND gate 410 is satisfied. If it is desired to trip-on-the-way-out (TOWO), i.e., EOOST is set to O or C, the only remaining condition necessary for the output of AND gate 410 to be asserted is for the positive-sequence impedance trajectory to move to the left of blinder RL7 (area 5), which will prevent the output of zone R7 from being asserted. AND gate 411 verifies if the positive-sequence trajectory lies in zone X6, i.e. between blinders XT6 and XB6. If that is true, then the output of AND gate 411 is asserted, causing a trip on-the-way-out on the first slip cycle.

Movement of the positive-sequence impedance trajectory from the left to the right hand plane of X-axis in the R-X plane is tracked in a similar manner, but uses the logic of AND gates 407-409 and flip-flops 434 and 435 as described herein. The output of AND gate 401 is asserted since PSB_I is asserted and the EOOST setting is enabled (not set to N). If the positive-sequence impedance trajectory is in areas 5 or 4, then the RR6 bit is asserted and the RL6 bit is not asserted, causing the output of AND gate 407 to assert and set the output of flip-flop 434. If the positive-sequence impedance trajectory moves in zone R6, i.e. between blinders RL6 and RR6 (in area 3), then the output of AND gate 408 is asserted and sets the output of flip-flop 435.

If the positive-sequence impedance trajectory moves to area 2 (between blinders RR6 and RR7) and then into area 1, as soon as RR6 drops-out, the output of AND gate 409 is asserted and through OR gate 421, the upper input of AND gate 410 is satisfied. If it is desired to trip-on-the-way-out (TOWO), i.e., the EOOST setting is set to O or C, the only remaining condition necessary for the output of AND gate 410 to be asserted is for the positive-sequence impedance trajectory to move to the right of blinder RR7 (area 1), which will prevent the output of zone R7 from being asserted. AND gate 411 verifies if the positive-sequence trajectory lies in zone X6, i.e. between blinders XT6 and XB6. If so, the output of AND gate 411 is asserted, causing a trip on-the-way-out on the first slip cycle.

Assuming now that the positive-sequence trajectory is moving between blinders XT6 and XT7 or between blinders XB6 and XB7, i.e., in zone X7 and outside of zone X6. Under such circumstances, if it is desired to trip after a set number of slip cycles, i.e., setting EOOST is set to C, AND gate 412 is asserted after the positive-sequence impedance trajectory moves across the R-X plane (either from right to left, or left to right) and the pole slip counter 440 is incremented by one count. When the positive-sequence impedance trajectory returns to the right hand plane after the first slip cycle, as soon as it crosses the RR7 blinder from right to left and RR7 asserts, flip-flops 432 and 434 are reset and the logic is ready to process the second slip cycle. Following satisfaction of the setting for the pole-slip counter 440, the output of flip-flop 436 is set. Thereafter, as soon as the positive-sequence impedance trajectory moves outside of zone R7, the output of AND gate 413 is asserted, causing a trip-on-the-way-out (TOWO) to occur after a preset number of slip cycles.

Referring now to application of a trip-on-the-way-in (TOWI), this function is accomplished if the following described conditions are satisfied. First, the output of AND gate 401 is asserted if PSB_I is asserted and setting EOOST is not set to N (i.e., EOOST is enabled). If the positive-sequence impedance trajectory moves from left to right, or right to left and enters area 3, i.e., zone R6, the output of AND gate 402 is asserted and the output of flip-flop 431 is set, which causes the bottom input of AND gate 403 to be satisfied. The trip-on-the-way-in (TOWI) will then take place (signified by assertion of the output of AND gate 403) if EOOST has been set to I and the positive-sequence impedance trajectory is in zone X6, i.e. between blinders XT6 and XB6.

Still referring to FIG. 23, reset of the PSB_I bit will in turn reset flip-flops 431-436 and will also reset pole-slip counter 440. Flip-flops 432 and 433 will also reset on dropout of RR7. Similarly, and flip-flops 434 and 435 will reset on dropout of RL7. This is done to allow the tracking of the impedance trajectory on subsequent slip cycles in order to be able to increment the pole-slip counter 440.

While the several aspects of the inventive subject matter described herein have been described with reference to certain illustrative embodiments, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

The invention claimed is:

1. A power swing detection system for use in conjunction with blocking at least one relay from operating in an electrical network, comprising:

a swing center voltage slope detector designed to detect an occurrence of a power swing within the electrical network based upon a time rate change of a swing center voltage value for the electrical network;

a swing signature detector operatively connected to said swing center voltage slope detector designed to distinguish between an occurrence of a power swing within the electrical network and an occurrence of a fault within the electrical network, said swing signature detector designed to detect the occurrence of a power swing within the electrical network under circumstances wherein the swing center voltage slope detector does not detect the occurrence of said power swing, said swing signature detector designed to detect an occurrence of a power swing within the electrical network based upon a time rate of change of a swing center voltage value for the electrical network; and a dependable power swing detector operatively connected to said swing center voltage slope detector and said swing signature detector designed to detect an occurrence of a power swing within the electrical network when conditions exist within said electrical network that would not permit said swing center voltage slope detector and said swing signature detector to detect said occurrence of said power swing within a predetermined period of time, said dependable power swing detector, upon detection of said occurrence of said power swing, asserting a temporary signal for a predetermined period of time to permit said swing center voltage slope detector to detect said occurrence of said power swing and thereby compensating for a pickup delay of said swing center voltage slope detector.

2. The power swing detection system of claim 1 further comprising reset logic operatively connected to said swing center voltage slope detector, said swing signature detector and said dependable power swing detector, said reset logic designed to reset a signal generated in response to detection of said occurrence of said power swing by said power swing detection system.

3. The power swing detection system of claim 1 further comprising a three-phase fault detector operatively connected to said swing center voltage slope detector, said swing signature detector and said dependable power swing detector, said three-phase fault detector designed to detect an occurrence of a three-phase fault within said electrical network and, in response, inhibit generation of a signal otherwise generated in response to detection of said occurrence of said power swing by said power swing detection system.

4. The power swing detection system of claim 1 wherein said swing center voltage value corresponds to a true swing center voltage for said electrical network.

5. The power swing detection system of claim 1 wherein said swing center voltage value corresponds to an approximate swing center voltage for said electrical network.

6. The power swing detection system of claim 1 wherein said swing center voltage slope detector generates a signal indicative of detection of an occurrence of a power swing in response to detection that an absolute value of a positive-sequence swing center voltage time rate of change for said electrical network is within a first predetermined range defined by a first maximum threshold and a first minimum threshold, in response to detection that a magnitude of a positive-sequence swing center voltage is within a second predetermined range defined by a second maximum threshold and a second minimum threshold, and in response to detection that a positive sequence impedance measured by a distance element is within a third predetermined range.

7. The power swing detection system of claim 1 wherein said swing signature detector compares a threshold based upon a maximum measurement of an absolute value of a positive-sequence swing center voltage time rate of change for said electrical network from a select plurality of such measurements to a plurality of measurements of an absolute value of a positive-sequence swing center voltage time rate of change for said electrical network to determine whether a discontinuity has occurred within a waveform for the positive-sequence swing center voltage of said electrical network.

8. The power swing detection system of claim 7 wherein said swing signature detector detects an occurrence of a fault within said electrical network in response to determining that a discontinuity has occurred within a waveform for the positive swing center voltage of said electrical network.

9. The power swing detection system of claim 8 wherein said swing signature detector may detect an occurrence of a power swing within said electrical network in response to determining that no discontinuity has occurred within said waveform for the positive swing center voltage of said electrical network.

10. The power swing detection system of claim 1 wherein said dependable power swing detector measures a second derivative time rate of change of a swing center voltage value for the electrical network to enable detection of an occurrence of a power swing within the electrical network under predetermined network conditions.

11. A method of detecting an occurrence of a power swing within an electrical network, comprising the steps of:
employing a first power swing detector to detect said occurrence of said power swing within the electrical network based upon a time rate change of a swing center voltage value for the electrical network;
employing a second power swing detector to distinguish between an occurrence of a power swing within the electrical network and an occurrence of a fault within the electrical network and detecting the occurrence of a power swing within the electrical network under circumstances wherein the first power swing detector does not detect the occurrence of said power swing, said second power swing detector detecting said occurrence of said power swing within the electrical network based upon a time rate of change of a swing center voltage value for the electrical network; and
employing a third power swing detector to detect said occurrence of said power swing within the electrical network when conditions exist within said electrical network that would not permit said first and second power swing detectors to detect said occurrence of said power swing within a predetermined period of time, said third power swing detector, upon detection of said occurrence of said power swing, asserting a temporary signal for a predetermined period of time to permit one of said first and second power swing detectors to detect said occurrence of said power swing and thereby compensating for a pickup delay of said one of said first and second power swing detectors.

* * * * *